United States Patent
Ohkubo

(10) Patent No.: US 10,863,563 B2
(45) Date of Patent: Dec. 8, 2020

(54) METHOD FOR CONTROLLING COMMUNICATION SYSTEM INCLUDING TERMINAL APPARATUS AND COMMUNICATION APPARATUS

(71) Applicant: CANON KABUSHIKI KAISHA, Tokyo (JP)

(72) Inventor: Hiroshi Ohkubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/392,079

(22) Filed: Apr. 23, 2019

(65) Prior Publication Data

US 2019/0335519 A1 Oct. 31, 2019

(30) Foreign Application Priority Data

Apr. 26, 2018 (JP) ................. 2018-085293

(51) Int. Cl.
*H04W 76/14* (2018.01)
*H04W 76/18* (2018.01)
*H04W 76/15* (2018.01)

(52) U.S. Cl.
CPC ............ *H04W 76/14* (2018.02); *H04W 76/15* (2018.02); *H04W 76/18* (2018.02)

(58) Field of Classification Search
CPC ..... H04W 76/14; H04W 76/15; H04W 76/18; H04W 36/03; H04W 84/20; H04N 2201/0094
See application file for complete search history.

(56) References Cited

U.S. PATENT DOCUMENTS

| 10,430,138 B2* | 10/2019 | Suga ................. G06F 3/1292 |
| 2011/0034127 A1* | 2/2011 | Wentink ............ H04W 76/12 455/41.2 |
| 2011/0085529 A1* | 4/2011 | Choi ................ H04L 29/08396 370/338 |
| 2014/0179317 A1* | 6/2014 | Tanaka .............. H04W 48/08 455/435.2 |
| 2015/0139203 A1* | 5/2015 | Miryala ............ H04W 28/0263 370/338 |
| 2015/0245399 A1* | 8/2015 | Aoki .................. H04W 76/14 370/329 |
| 2015/0365986 A1* | 12/2015 | Lee ................... H04W 72/085 370/329 |

(Continued)

FOREIGN PATENT DOCUMENTS

JP    2014-195215 A    10/2014

*Primary Examiner* — Devan A Sandiford
(74) *Attorney, Agent, or Firm* — Canon U.S.A., Inc. I.P. Division

(57) ABSTRACT

A control method includes determining, when a communication apparatus and a terminal apparatus are connected to the same external apparatus as a result of establishing a first connection, whether communication between the communication apparatus and the terminal apparatus via the external apparatus is executable, and establishing a second connection between the terminal apparatus and the communication apparatus without intervention of the external apparatus based on a determination, while the established first connection is maintained, that communication between the communication apparatus and the terminal apparatus via the external apparatus is not executable.

19 Claims, 10 Drawing Sheets

(56) References Cited

U.S. PATENT DOCUMENTS

| | | | |
|---|---|---|---|
| 2016/0094726 A1* | 3/2016 | Abe | H04W 48/16 |
| | | | 358/1.15 |
| 2017/0134416 A1* | 5/2017 | Kawakita | H04L 45/38 |
| 2017/0318184 A1* | 11/2017 | Suzuki | H04N 1/00204 |
| 2017/0339132 A1* | 11/2017 | Araki | H04W 12/0401 |
| 2017/0339736 A1* | 11/2017 | Suga | H04W 76/14 |
| 2017/0339743 A1* | 11/2017 | Watanabe | G06F 3/121 |
| 2018/0027144 A1* | 1/2018 | Yokoyama | H04B 1/00 |
| | | | 358/1.13 |
| 2018/0324876 A1* | 11/2018 | Iwami | H04W 84/12 |
| 2019/0053309 A1* | 2/2019 | Araki | H04W 88/10 |
| 2019/0200281 A1* | 6/2019 | Inohiza | H04W 76/10 |
| 2019/0235801 A1* | 8/2019 | Shimazaki | H04N 1/00127 |
| 2019/0297657 A1* | 9/2019 | Suga | H04N 1/32765 |

* cited by examiner

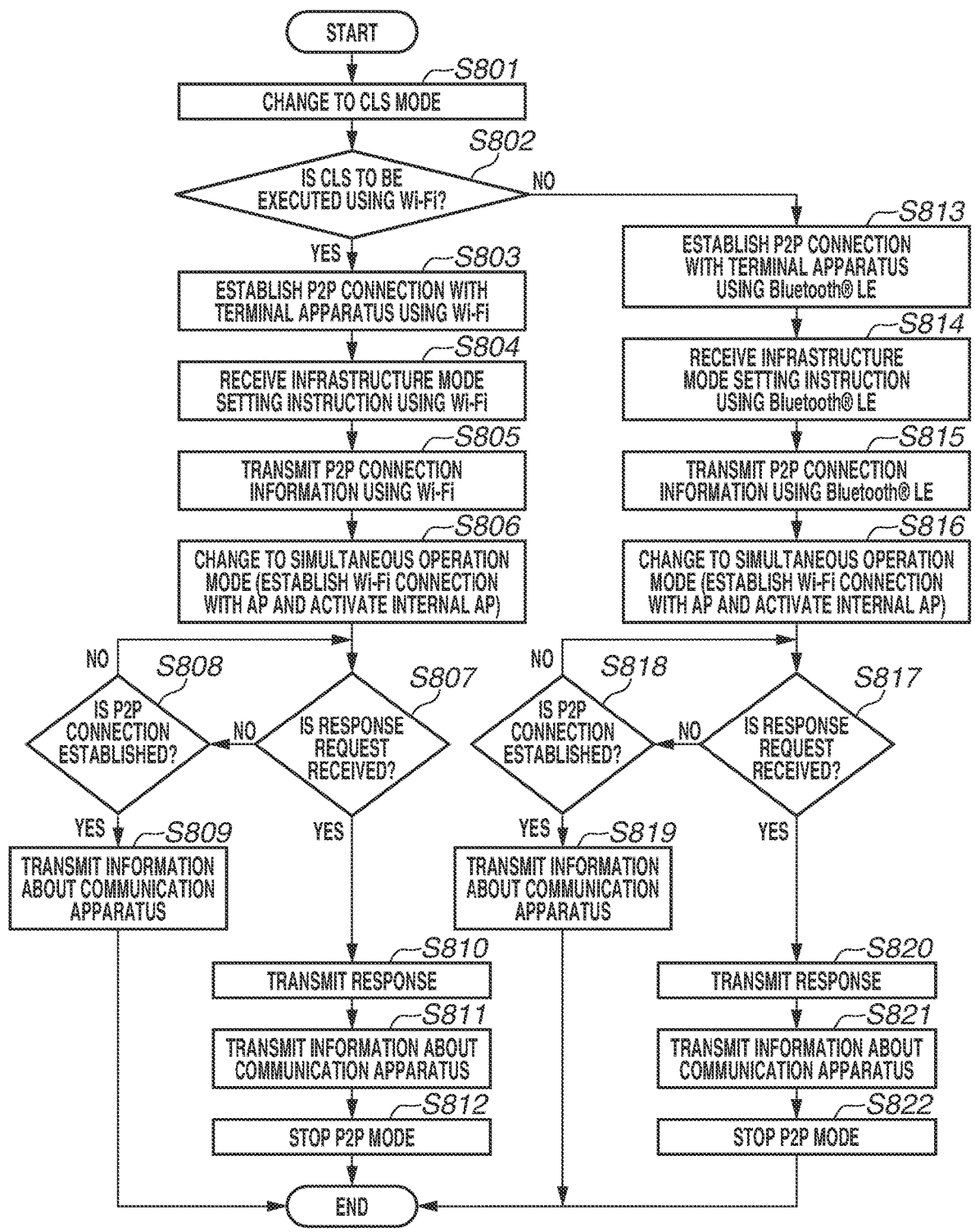

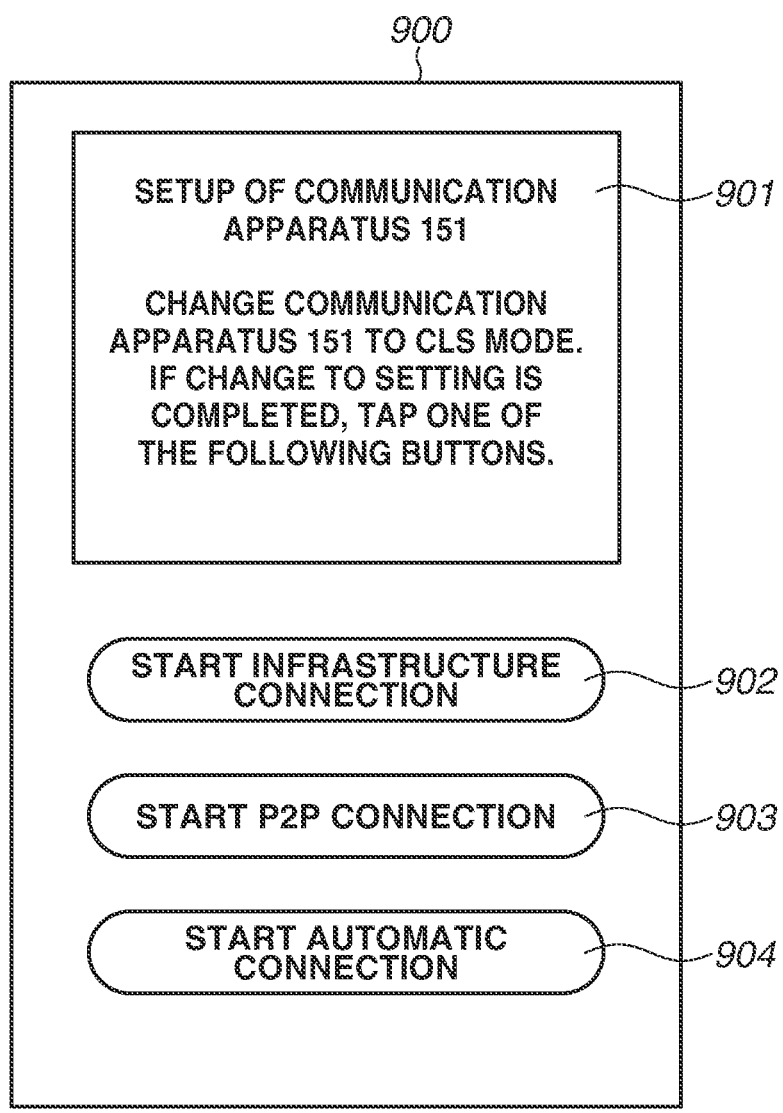

METHOD FOR CONTROLLING COMMUNICATION SYSTEM INCLUDING TERMINAL APPARATUS AND COMMUNICATION APPARATUS

BACKGROUND

Field

The present disclosure relates to a control method.

Description of the Related Art

A method of establishing a connection via an external apparatus such as an access point (AP) is a method whereby a terminal apparatus, such as a smartphone, connects to a communication apparatus, such as a network-supporting printer, using a communication method such as wireless local area network (LAN) communication. This connection method is referred to as "infrastructure connection". The terminal apparatus and the communication apparatus establish an infrastructure connection and enable the external apparatus to relay communication so that the terminal apparatus and the communication apparatus can, for example, perform bi-directional communication or connect to the Internet to use a service on the Internet.

There is, however, a case where despite the fact that the terminal apparatus and the communication apparatus are connected to the same external apparatus, the terminal apparatus and the communication apparatus cannot communicate via the external apparatus because, for example, the external apparatus does not relay communication due to a privacy separator function.

Japanese Patent Application Laid-Open No. 2014-195215 discusses a communication apparatus configured to disconnect a connection with an external apparatus and establish a connection with a terminal apparatus without intervention of the external apparatus (ad hoc connection) in a case where the terminal apparatus and the communication apparatus cannot communicate via the external apparatus although the terminal apparatus and the communication apparatus are connected to the same external apparatus. Using the method discussed in Japanese Patent Application Laid-Open No. 2014-195215, the terminal apparatus and the communication apparatus can communicate using the ad hoc connection instead of an infrastructure connection.

Even in the case where the terminal apparatus and the communication apparatus cannot communicate via the external apparatus although the terminal apparatus and the communication apparatus are connected to the same external apparatus, it is not always the case that the communication apparatus and an apparatus other than the terminal apparatus cannot communicate via the external apparatus.

As described above, the communication apparatus discussed in Japanese Patent Application Laid-Open No. 2014-195215 disconnects the connection established with the external apparatus in the case where the terminal apparatus and the communication apparatus cannot communicate via the external apparatus although the terminal apparatus and the communication apparatus are connected to the same external apparatus. Thus, the technique discussed in Japanese Patent Application Laid-Open No. 2014-195215 has a problem that the communication apparatus cannot also communicate with an apparatus other than the terminal apparatus via the external apparatus in the case where the terminal apparatus and the communication apparatus cannot communicate via the external apparatus although the terminal apparatus and the communication apparatus are connected to the same external apparatus.

SUMMARY

In view of the above-described drawback, the an aspect of the present disclosure is directed to a technique that executes both communication between a terminal apparatus and a communication apparatus and communication between the communication apparatus and an apparatus other than the terminal apparatus in a case where the terminal apparatus and the communication apparatus cannot communicate via an external apparatus although the terminal apparatus and the communication apparatus are connected to the same external apparatus.

According to an aspect of the present disclosure, a method for controlling a communication system including a terminal apparatus and a communication apparatus includes establishing a first connection between the communication apparatus and an external apparatus located external to the terminal apparatus and external to the communication apparatus, determining, in a state where the communication apparatus and the terminal apparatus are connected to a same external apparatus as a result of the establishing the first connection, whether communication between the communication apparatus and the terminal apparatus via the external apparatus is executable, and establishing, in a state in which the established first connection is maintained, a second connection between the terminal apparatus and the communication apparatus without intervention of the external apparatus based on a determination that communication between the communication apparatus and the terminal apparatus via the external apparatus is not executable.

Further features will become apparent from the following description of exemplary embodiments with reference to the attached drawings.

BRIEF DESCRIPTION OF THE DRAWINGS

FIG. 8 is a flowchart illustrating a cableless setup that is executed by the communication apparatus according to the exemplary embodiment.

FIG. 9 illustrates an example of a setting screen that is displayed by the terminal apparatus according to the exemplary embodiment.

DESCRIPTION OF THE EMBODIMENTS

Exemplary embodiments will be described in detail below with reference to the drawings. It should be noted that the relative positions of components, display screens, etc. described in the exemplary embodiments are not intended to be limiting unless otherwise specified, and that the components can be changed.

A terminal apparatus and a communication apparatus according to a first exemplary embodiment will be described below. In the present exemplary embodiment, a smartphone will be described as an example of the terminal apparatus. The smartphone is a multi-function mobile phone including a camera function, web browser function, and e-mail function in addition to the functions of a mobile phone. A terminal apparatus to which the present exemplary embodiment is applicable is not limited to a smartphone and can be any apparatus that communicates with a communication apparatus described below. Examples of a terminal apparatus to which the present exemplary embodiment is applicable include a digital camera, mobile phone, personal computer (PC), tablet terminal, and personal digital assistant (PDA). While a multi-function printer (hereinafter, "MFP") that provides a copy service, fax service, and print service is described as an example of the communication apparatus in the present exemplary embodiment, the communication apparatus is not limited to a MFP. The present exemplary embodiment is applicable to various communication apparatuses that communicate with the terminal apparatus. Examples of a printer to which the present exemplary embodiment is applicable include an inkjet printer, full-color laser beam printer, and monochrome printer. The present exemplary embodiment is also applicable to an apparatus that provides a service other than a print service, such as a copy machine, facsimile apparatus, smartphone, mobile phone, PC, tablet terminal, PDA, digital camera, music reproduction device, storage, projector, or smart speaker. The smart speaker is an apparatus that instructs a device located on the same network to execute processing according to user voice and notifies the user of information acquired via the network in response to the user voice. The present exemplary embodiment is also applicable to a single-function printer (hereinafter, "SFP") having a single function.

System Configuration

First, a system configuration for realizing the present exemplary embodiment will be described.

Figure 1:
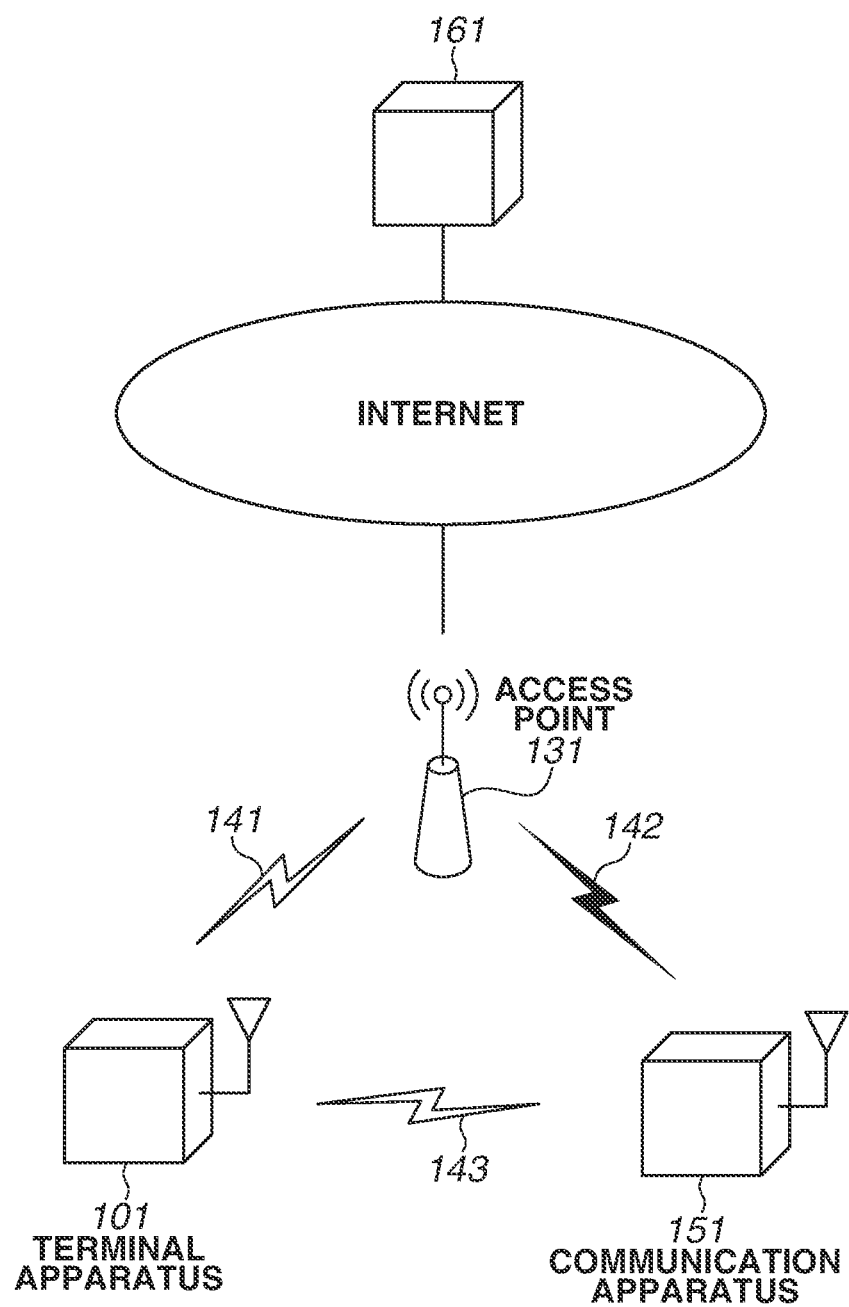
FIG. 1 illustrates an example of a communication system according to an exemplary embodiment.

FIG. 1 illustrates an example of a configuration of a communication system according to the present exemplary embodiment. The communication system includes a communication apparatus 151, a terminal apparatus 101, an access point (AP) 131, and an external server 161.

The terminal apparatus 101 is a terminal apparatus according to the present exemplary embodiment. The communication apparatus 151 is a communication apparatus according to the present exemplary embodiment. The AP 131 is an external apparatus located outside the terminal apparatus 101 and outside the communication apparatus 151. The external server 161 is a server that provides a service via the Internet to an apparatus connected to the AP 131.

A local area network (LAN) formed by the AP 131 includes the AP 131, the communication apparatus 151, and the terminal apparatus 101. Meanwhile, a wide area network (WAN) includes the AP 131 and the external server 161.

In the present exemplary embodiment, the terminal apparatus 101 can communicate with the communication apparatus 151 via the AP 131 in a case where an infrastructure connection described below is established. The terminal apparatus 101 can communicate with the communication apparatus 151 directly without intervention of the AP 131 in a case where a peer-to-peer (P2P) connection is established.

In the present exemplary embodiment, a connection 141 between the terminal apparatus 101 and the AP 131 and a connection 142 between the communication apparatus 151 and the AP 131 are connections established by a communication method based on the Institute of Electrical and Electronics Engineers (IEEE) 802.11 standards. Specifically, the communication method based on the IEEE 802.11 standards is a Wi-Fi® (Wireless Fidelity) connection. A connection 143 between the terminal apparatus 101 and the communication apparatus 151 is a Wi-Fi® connection or Bluetooth® Low Energy connection. The communication methods used in the connections are not limited to those described above and can be, for example, Classic Bluetooth®, Wi-Fi Aware™, or Near Field Communication (NFC). The AP 131 and the external server 161 can communicate via the Internet, and in a state where the AP 131 is connected to the Internet, an apparatus (the terminal apparatus 101 and the communication apparatus 151) connected to the AP 131 can also use the Internet.

Figure 2:
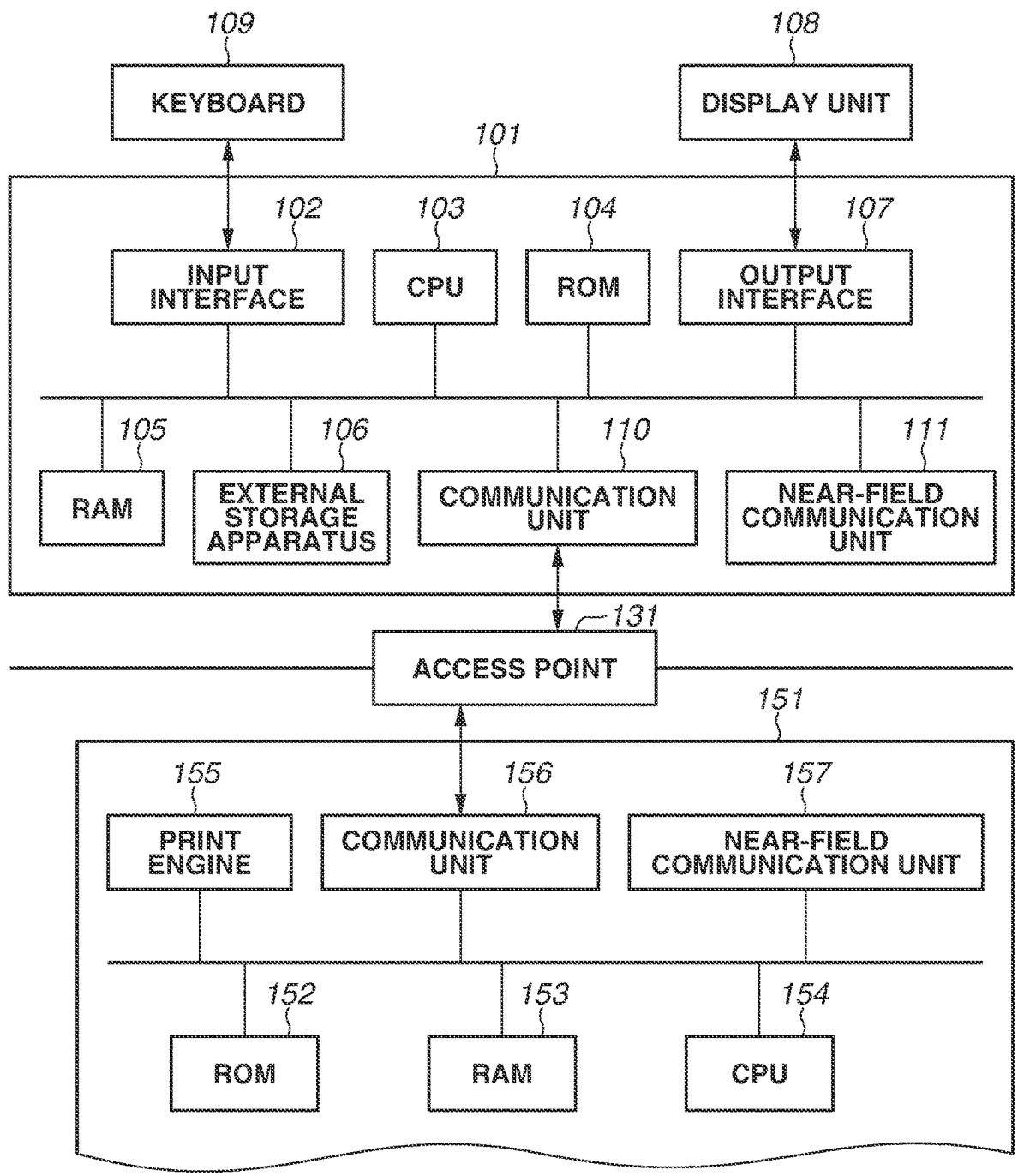
FIG. 2 illustrates an example of configuration of a terminal apparatus and a communication apparatus according to the exemplary embodiment.

Configurations of the terminal apparatus 101 and the communication apparatus 151 will be described with reference to a block diagram illustrated in FIG. 2. While the configurations are described as an example in the present exemplary embodiment, the functions are not limited to those illustrated in FIG. 2.

The terminal apparatus 101 includes an input interface 102, a central processing unit (CPU) 103, a read-only memory (ROM) 104, a random access memory (RAM) 105, an external storage apparatus 106, an output interface 107, a display unit 108, a communication unit 110, and a near-field communication unit 111.

The input interface 102 is an interface for receiving user-input data and operation instructions input by operating a keyboard 109.

The CPU 103 is a system control unit and controls the entire terminal apparatus 101.

The ROM 104 stores fixed data such as control programs to be executed by the CPU 103, a data table, and an embedded operating system (hereinafter, "OS") program. In the present exemplary embodiment, each control program stored in the ROM 104 executes software execution control, such as scheduling, task switching, and interruption processing, under the management by the embedded OS stored in the ROM 104.

The RAM 105 includes a static RAM (SRAM) which requires a backup power source. The RAM 105 holds data using a primary battery (not illustrated) for data backup, so that important data such as a program control variable can be stored without volatilization. The RAM 105 also includes a memory area for storing setting information about the terminal apparatus 101 and management data on the terminal apparatus 101. The RAM 105 is also used as a main memory of the CPU 103 and a work memory.

The external storage apparatus 106 stores an application for executing a cableless setup described below, an application that provides a printing execution function, and a print information generation program for generating print information that is interpretable by the communication apparatus 151. The external storage apparatus 106 also stores various programs, such as a program for controlling transmission and reception of information to and from the communication apparatus 151 connected via the communication unit 110, and various information to be used by the programs.

The output interface 107 is an interface that executes control so that the display unit 108 displays data or a notification of the state of the terminal apparatus 101.

The display unit 108 includes a light-emitting diode (LED) and a liquid crystal display (LCD) and displays data and a notification of the state of the terminal apparatus 101. An operation unit, such as a numerical value input key, mode setting key, OK key, cancel key, and power key, can be provided on the display unit 108 so that the input interface 102 receives user input via the display unit 108.

The communication unit 110 is configured to connect to an apparatus such as the communication apparatus 151 or the AP 131 to execute data communication. For example, the communication unit 110 is connectable to an access point (not illustrated) provided in the communication apparatus 151. The communication unit 110 connects to the access point in the communication apparatus 151 so that the terminal apparatus 101 and the communication apparatus 151 can communicate with each other. The communication unit 110 can directly communicate with the communication apparatus 151 via wireless communication or can communicate with the communication apparatus 151 via an external apparatus located outside the terminal apparatus 101 and outside the communication apparatus 151. The external apparatus includes an external access point (AP 131) and an apparatus that relays communication other than an access point. Examples of a wireless communication method include Wi-Fi®. Examples of the AP 131 include a device such as a wireless LAN router. In the present exemplary embodiment, a method whereby the terminal apparatus 101 and the communication apparatus 151 are directly connected without intervention of an external access point is referred to as a P2P connection method. A method whereby the terminal apparatus 101 and the communication apparatus 151 are connected via an external access point is referred to as an infrastructure connection method.

The near-field communication unit 111 is configured to establish a near-field wireless connection with an apparatus, such as the communication apparatus 151, and execute data communication, and executes communication using a communication method different from that of the communication unit 110. The near-field communication unit 111 is connectable to, for example, a near-field communication unit 157 in the communication apparatus 151. Examples of the communication method include Classic Bluetooth®, Bluetooth® Low Energy, Wi-Fi Aware™, and NFC.

In the present exemplary embodiment, the communication method used by the communication unit 110 is a method that enables communication at higher speed and greater distance than the communication method used by the near-field communication unit 111. The near-field communication unit 111 is used to exchange communication information that is necessary for the communication unit 110 to perform communication, with an apparatus such as the communication apparatus 151.

The communication apparatus 151 is a communication apparatus according to the present exemplary embodiment. The communication apparatus 151 includes a ROM 152, a RAM 153, a CPU 154, a print engine 155, a communication unit 156, and the near-field communication unit 157. The CPU 154, the ROM 152, and the RAM 153 form a computer.

The communication unit 156 includes, as an internal access point provided in the communication apparatus 151, an access point for connecting to an apparatus such as the terminal apparatus 101. The access point is connectable to the communication unit 110 of the terminal apparatus 101. The communication unit 156 can directly communicate with the terminal apparatus 101 via wireless communication or can communicate with the terminal apparatus 101 via the AP 131. Examples of the communication method include Wi-Fi®. The communication unit 156 can include hardware configured to function as an access point or can operate as an access point using software for functioning as an access point.

The near-field communication unit 157 is configured to establish a near-field wireless connection with an apparatus such as the terminal apparatus 101 and is connectable to, for example, the near-field communication unit 111 in the terminal apparatus 101. Examples of the communication method include Classic Bluetooth®, Bluetooth® Low Energy, Wi-Fi Aware™, and NFC.

In the present exemplary embodiment, the communication method used by the communication unit 156 is a method that enables communication at higher speed than the communication method used by the near-field communication unit 157. The near-field communication unit 157 is used to exchange communication information necessary for the communication unit 156 to perform communication, with an apparatus such as the terminal apparatus 101. The near-field communication unit 157 functions as an advertiser (or slave) configured to broadcast advertisement information described below, whereas the near-field communication unit 111 functions as a scanner (or master) configured to receive the advertisement information.

The RAM 153 includes a SRAM which requires a backup power source. The RAM 153 holds data using a primary battery (not illustrated) for data backup, so that important data such as a program control variable can be stored without volatilization. The RAM 153 also includes a memory area for storing setting information about the communication apparatus 151 and management data on the communication apparatus 151. The RAM 153 is also used as a main memory of the CPU 154 and a work memory and stores a reception buffer for temporarily storing print information received from the terminal apparatus 101 and stores various information.

The ROM 152 stores fixed data such as control programs to be executed by the CPU 154, data table, and OS program. In the present exemplary embodiment, each control program stored in the ROM 152 executes software execution control such as scheduling, task switching, and interruption processing under the management by the embedded OS stored in the ROM 152.

The CPU 154 is a system control unit and controls the entire communication apparatus 151.

The print engine 155 forms an image on a recording medium by applying a recording agent such as an ink onto a recording medium such as a sheet based on information stored in the RAM 153 and a print job received from the terminal apparatus 101, and outputs a print result. At this time, the print job transmitted from the terminal apparatus 101 has a large amount of data to be transmitted, and high-speed communication is required, so that the print job is received via the communication unit 156 that performs communication at higher speed than the near-field communication unit 157.

A memory such as an external hard disk drive (HDD) or secure digital (SD) card can be attached as an optional device to the communication apparatus 151, and the information stored in the communication apparatus 151 can be stored in the attached memory.

While an example of a division of roles of the terminal apparatus 101 and the communication apparatus 151 is described above in the present exemplary embodiment, the division of roles is not limited to the above-described example and can be in any other form.

Bluetooth® Low Energy Communication

Figure 10A:
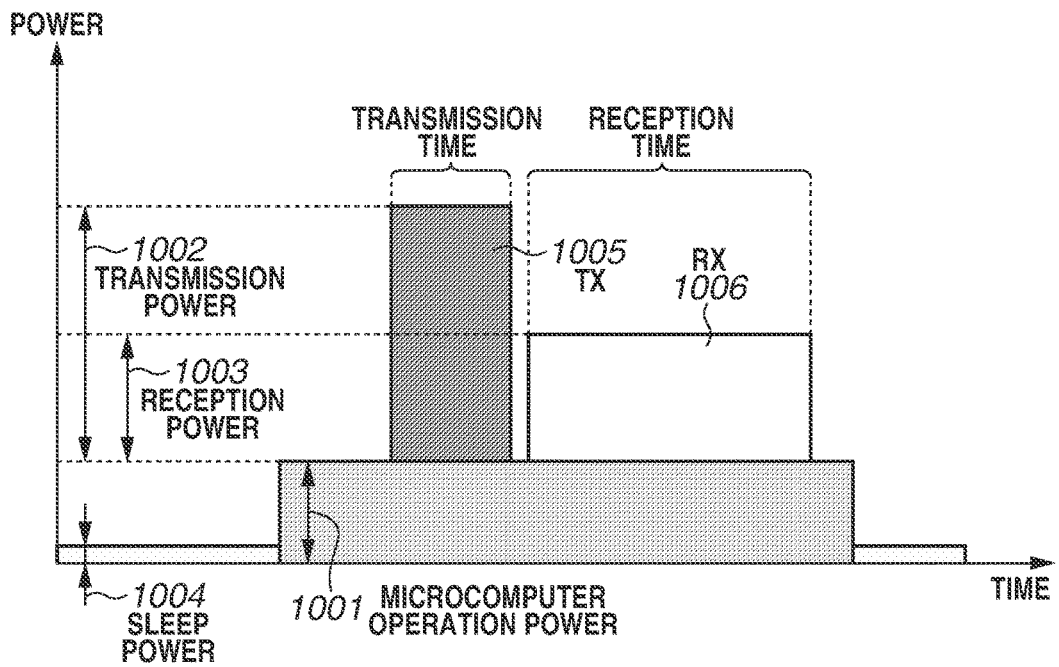
FIGS. 10A and 10B illustrate Bluetooth® Low Energy communication according to the exemplary embodiment.

A process of transmitting the advertisement information based on the Bluetooth® Low Energy standards and receiving a generic attribute profile (GATT) communication start request will be described with reference to FIGS. 10A and 10B. In the present exemplary embodiment, the near-field communication unit 157 operates as a slave device, so that the near-field communication unit 157 executes the process.

The near-field communication unit 157 divides a 2.4-GHz frequency band into 40 channels (0 ch to 39 ch) and executes communication. The near-field communication unit 157 uses the $37^{th}$ to $39^{th}$ channels among the 40 channels in transmission of the advertisement information and reception of the GATT communication start request, and uses the $0^{th}$ to $36^{th}$ channels in data communication after establishing the Bluetooth® Low Energy connection. In FIG. 10A, the vertical axis represents the power consumption by the near-field communication unit 157, and the horizontal axis represents the time, and the power consumption in the transmission of the advertisement information using one channel is specified for each process. Tx1005 indicates the total power consumption in transmission processing which is the processing of broadcasting the advertisement information, and Rx1006 indicates the total power consumption in reception processing which is the processing of enabling a reception device for receiving the GATT communication start request. The near-field communication unit 111 having received the advertisement information transmits the GATT communication start request to the near-field communication unit 157.

A transmission power 1002 indicates an instantaneous power consumption in transmission processing. A reception power 1003 indicates an instantaneous power consumption in reception processing. A microcomputer operation power 1001 indicates an instantaneous power consumption in a case where a microcomputer in the near-field communication unit 157 operates. The microcomputer operates before, between, and after the Tx1005 and the Rx1006 because the microcomputer needs to be activated in advance in order to execute or stop transmission processing or reception processing. In a case of transmitting the advertisement information using a plurality of channels, the power consumption is increased by the number of channels that perform transmission of the advertisement information. While the microcomputer does not operate and the near-field communication unit 157 is in a power-saving state, a sleep power 1004 is the instantaneous power consumption of the near-field communication unit 157. In this way, the near-field communication unit 157 executes transmission processing using the predetermined channels and thereafter executes reception processing for a predetermined period using the same channels to thereby wait for transmission of a GATT communication start request from the near-field communication unit 111. If the near-field communication unit 157 receives a GATT communication start request from the near-field communication unit 111, the near-field communication unit 157 establishes a Bluetooth® Low Energy connection with the near-field communication unit 111 to thereby enable GATT communication with the near-field communication unit 111 thereafter. The Bluetooth® Low Energy communication described below can be communication based on the advertisement information or GATT communication.

Figure 10B:
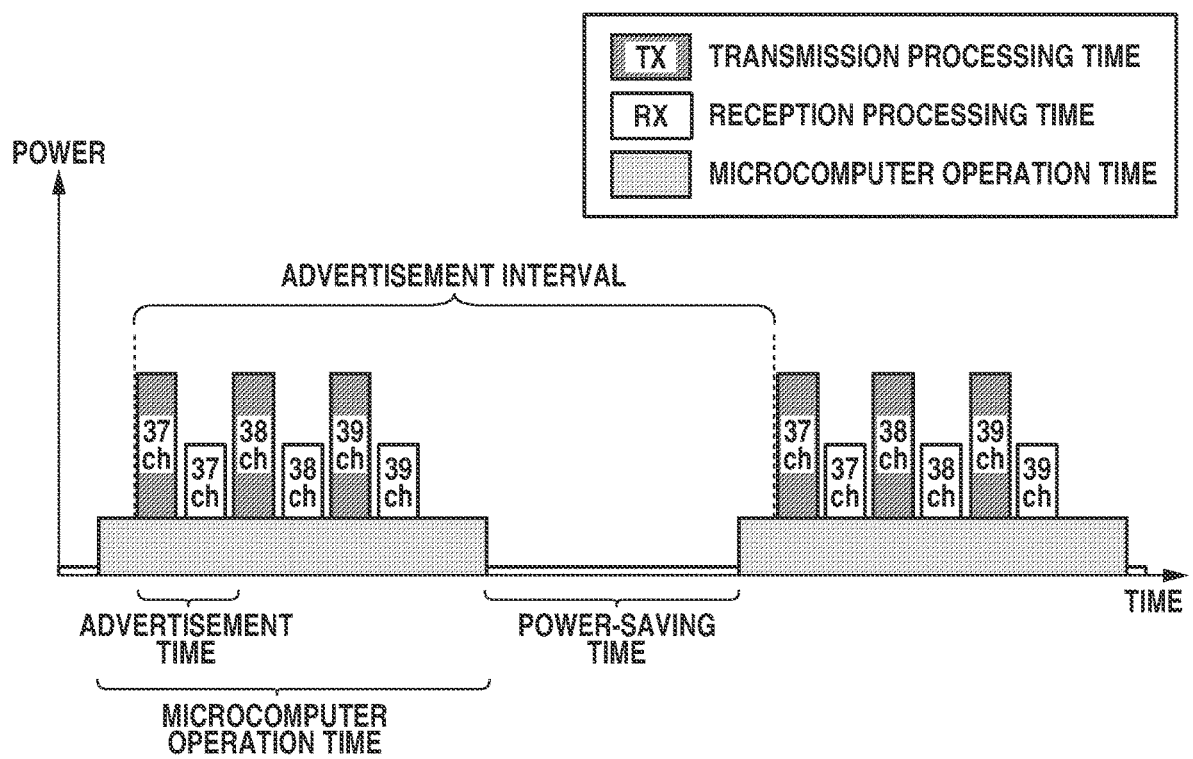

The near-field communication unit 157 repeats advertisement information transmission processing and reception processing three times for each channel and thereafter stops the operation of the microcomputer, and the power-saving state continues for a predetermined period, as illustrated in FIG. 10B. Hereinafter, a combination of advertisement information transmission processing and reception processing using the predetermined channels will be referred to as "advertisement". A time interval of the transmission of the advertisement information using the predetermined channels is referred to as "advertisement interval". The number of times the advertisement is repeated until the state is changed to the power-saving state after the first advertisement is executed can be changed to any number equal to or less than three.

In the present exemplary embodiment, the near-field communication unit 157 starts operation as a slave device in Bluetooth® Low Energy based on an event that an operation in a cableless setup (CLS) mode described below is started, an event that a user operation to enable the Bluetooth® Low Energy function is received, or an event that the communication apparatus 151 is turned on.

Wi-Fi Communication (P2P Mode)

To establish a connection using a P2P method (hereinafter, P2P connection) in Wi-Fi® communication, the communication apparatus 151 according to the present exemplary embodiment operates in a P2P mode (software AP mode, Wi-Fi Direct® (WFD) mode). In the present exemplary embodiment, the term "P2P connection" refers to a direct wireless connection between the apparatuses without intervention of an external apparatus such as the AP 131. The communication apparatus 151 operating in the P2P mode operates as a parent device in the network to which the communication apparatus 151 belongs. The P2P mode includes the WFD mode and the software AP mode described below.

WFD is a standard developed by Wi-Fi® Alliance. The terminal apparatus 101 and the communication apparatus 151 which support WFD can directly establish a wireless connection with each other without intervention of another access point using WFD. An apparatus that supports WFD and plays a role as an access point is particularly referred to as a "group owner". A mode in which a P2P connection is executed using WFD is referred to as a "WFD mode".

The communication apparatus 151 includes a software AP function to operate as an access point. The communication apparatus 151 enables (activates) a software AP in the communication apparatus 151, and the terminal apparatus 101 connects to the software AP using normal Wi-Fi® instead of WFD. The connection is established in this way so that the terminal apparatus 101 and the communication apparatus 151 can directly establish a wireless connection with each other without intervention of another access point. A mode in which the software AP in the communication apparatus 151 is enabled and operated to thereby execute a P2P connection will be referred to as "software AP mode". If the software AP mode is stopped, the communication apparatus 151 disables the software AP in the communication apparatus 151 and is changed to a state in which a P2P connection with another apparatus using the software AP cannot be established.

In the P2P mode, the communication apparatus 151 operates as a parent device, so that the communication apparatus 151 can determine a communication channel to be used in the communication in the P2P mode. For example, in a case where the communication apparatus 151 operates in the infrastructure mode and the P2P mode simultaneously, the communication apparatus 151 executes control in such a manner that the communication channel used in the communication in the infrastructure mode is also used in the communication in the P2P mode. For example, the communication apparatus 151 can preferentially select the communication channel used in the communication with the AP 131 over the other channels as a channel to be used in the communication in the P2P mode.

Connection information (service set identifier (SSID) and password) for connecting to the communication apparatus 151 in the P2P mode can be arbitrarily changed by a user operation on an operation unit of the communication apparatus 151.

Wi-Fi Communication (Infrastructure Mode)

To establish a connection (hereinafter, "infrastructure connection") using the infrastructure method in Wi-Fi® communication, the communication apparatus 151 according to the present exemplary embodiment operates in the infrastructure mode. In the present exemplary embodiment, the infrastructure connection refers to a wireless connection established between apparatuses via an external apparatus such as the AP 131 which comprehensively controls the network and operates as a parent device. The communication apparatus 151 operating in the infrastructure mode operates as a child device in the network to which the communication apparatus 151 belongs.

The communication apparatus 151 and the terminal apparatus 101 are connected in the infrastructure mode via the AP 131 to thereby enable communication between the communication apparatus 151 and the terminal apparatus 101 via the AP 131. The channel used in the communication in the infrastructure mode can be a frequency band (5.0 Ghz band, etc.) other than the 2.4-Ghz frequency band. To communicate with the communication apparatus 151 via the AP 131, the terminal apparatus 101 needs to recognize that the communication apparatus 151 belongs to the network that is formed by the AP 131 and to which the terminal apparatus 101 belongs. Specifically, the terminal apparatus 101 transmits a search signal to the network to which the terminal apparatus 101 belongs, via the AP 131 and checks communication with the communication apparatus 151.

In the present exemplary embodiment, a state un which the terminal apparatus 101 and the communication apparatus 151 are simply connected to the same AP is referred to as an "infrastructure connection state". Specifically, in the infrastructure connection state, the terminal apparatus 101 and the communication apparatus 151 only need to be connected to the same AP and do not have to recognize that the counterpart apparatus belongs to the network to which the apparatus belongs.

Simultaneous Operation

The communication apparatus 151 according to the present exemplary embodiment executes operation in the infrastructure mode and operation in the P2P mode simultaneously (in parallel). Thus, the communication apparatus 151 can maintain a connection for communication in the infrastructure mode and a connection for communication in the P2P mode simultaneously (in parallel). Hereinafter, establishing an infrastructure connection and a P2P connection simultaneously (in parallel) to operate in such a manner that communication via the infrastructure connection and communication via the P2P connection are executable simultaneously (in parallel) will be referred to as "simultaneous operation". In other words, in the simultaneous operation, the communication apparatus 151 executes operation as a parent device (group owner, access point) and operation as a child device in parallel.

The communication in the infrastructure mode and the communication in the P2P mode are executed using a specific frequency band (specific channel). Thus, in either one of the communication in the infrastructure mode and the communication in the P2P mode, a channel to be used in the communication/connection between the apparatuses needs to be determined before a start of communication. In an arrangement in which a plurality of channels is simultaneously assigned to one wireless integrated circuit (IC) chip and communication is executed, the configurations of the apparatuses that execute communication and the processing to be executed by the apparatuses become complicated. Thus, for example, in the case where the communication apparatus 151 executes simultaneous operation, it is desirable to use a shared channel in the communication in each mode. Specifically, the communication apparatus 151 desirably uses only one channel even in the case of executing simultaneous operation. Thus, in the present exemplary embodiment, the communication unit 156 includes only one wireless IC chip for realizing communication using the predetermined channel, and the communication apparatus 151 does not execute communication using a plurality of channels simultaneously.

Connection Setting Processing

In the present exemplary embodiment, the terminal apparatus 101 sets a setting (connection setting) for operating the communication apparatus 151 in at least one of the communication modes from the infrastructure mode and the P2P mode, using wireless communication with the communication apparatus 151. The connection setting processing according to the present exemplary embodiment is executed via wireless communication and, thus, referred to as "CLS". The terminal apparatus 101 executes CLS using an application (CLS application) for executing the CLS installed in the terminal apparatus 101. The connection setting processing can be executed using wired communication instead of wireless communication.

In the case of connecting the AP 131 and the communication apparatus 151 and operating the communication apparatus 151 in the infrastructure mode, the terminal apparatus 101 wirelessly transmits, to the communication apparatus 151, an infrastructure setting command for operating the communication apparatus 151 in the infrastructure mode. The infrastructure setting command is, for example, information about the AP 131. The information about the AP 131 is, for example, the SSID of the AP 131 and a password for connecting to the AP 131.

On the other hand, in the case of operating the communication apparatus 151 in the P2P mode, the terminal apparatus 101 wirelessly transmits, to the communication apparatus 151, a P2P setting command for operating the communication apparatus 151 in the P2P mode. The terminal apparatus 101 acquires, from the communication apparatus 151, information for establishing a P2P connection with the communication apparatus 151. The information for establishing a P2P connection with the communication apparatus 151 is, for example, the SSID of the communication apparatus 151 and a password for connecting to the communication apparatus 151. In the case where the communication apparatus 151 receives the P2P setting command, the communication apparatus 151 can enable the WFD function to operate as a group owner or can enable the internal AP in the communication apparatus 151.

In the present exemplary embodiment, the P2P connection for CLS between the terminal apparatus 101 and the communication apparatus 151 is used in the transmission of the infrastructure setting command or the P2P setting command and the acquisition of the information for establishing a P2P connection with the communication apparatus 151 in CLS. In the present exemplary embodiment, there are two P2P connections for CLS, which are a Wi-Fi® connection (connection established by the communication units 110 and 156) and a Bluetooth® Low Energy connection (connection established by the near-field communication units 111 and 157).

Now, the CLS using Wi-Fi® connection and the CLS using Bluetooth® Low Energy connection will be described below.

As the P2P connection for CLS, a communication method other than Wi-Fi® and Bluetooth® Low Energy, such as Classic Bluetooth®, can be used.

After an infrastructure connection or P2P connection is established between the terminal apparatus 101 and the communication apparatus 151 by the CLS using Wi-Fi®, the terminal apparatus 101 and the communication apparatus 151 can communicate via the established connection. Specifically, for example, the terminal apparatus 101 can transmit a print job for causing the communication apparatus 151 to execute printing or a scan job for causing the communication apparatus 151 to execute scanning to the communication apparatus 151 via the established connection.

Function of AP 131

The AP 131 includes a privacy separator setting function. The privacy separator setting function is a function of setting a privacy separator function, which is a function whereby the AP 131 does not relay communication in the LAN formed by the AP 131, to ON/OFF. In the case where the privacy separator function of the AP 131 is set to ON (enabled), the AP 131 does not relay communication in the LAN formed by the AP 131. Specifically, in the case where the terminal apparatus 101 and the communication apparatus 151 exist in the LAN formed by the AP 131 in the state in which the privacy separator function of the AP 131 is set to ON, the AP 131 does not relay communication between the terminal apparatus 101 and the communication apparatus 151. On the other hand, in the case where the privacy separator function of the AP 131 is set to OFF (disabled), the AP 131 relays communication in the LAN formed by the AP 131.

The setting of the privacy separator function of the AP 131 can be changed by, for example, a user operation that is executed directly on the AP 131. The setting of the privacy separator function of the AP 131 can be changed by, for example, a command transmitted from a terminal apparatus (not illustrated) connected to the AP 131 to the AP 131 by a user operation performed on the terminal apparatus.

The AP 131 includes a function of relaying communication between an apparatus in the LAN formed by the AP 131 and an apparatus located in the WAN including the AP 131. In this way, the apparatus in the LAN formed by the AP 131 can receive a service provided from the external server 161 using the Internet in the state in which the apparatus is connected to the AP 131. The relay of the communication between the apparatus in the LAN formed by the AP 131 and the apparatus in the WAN including the AP 131 is executed regardless of whether the setting of the privacy separator function of the AP 131 is set to ON or OFF. Specifically, even if the setting of the privacy separator function of the AP 131 is set to ON, the apparatus in the LAN formed by the AP 131 can receive a service provided from the external server 161 using the Internet.

Meanwhile, as described above, according to the present exemplary embodiment, the terminal apparatus 101 executes CLS to connect the AP 131 to which the terminal apparatus 101 is connected and the communication apparatus 151 and establish an infrastructure connection between the terminal apparatus 101 and the communication apparatus 151 via the AP 131. However, in the case where the privacy separator function of the AP 131 is set to ON, even if the infrastructure connection is established between the terminal apparatus 101 and the communication apparatus 151 via the AP 131, no communication is executed between the terminal apparatus 101 and the communication apparatus 151.

Thus, in the present exemplary embodiment, a description is given of an arrangement in which control is performed so that communication is executed between the terminal apparatus 101 and the communication apparatus 151 even in the case where the privacy separator function of the AP 131 is set to ON.

Control According to Present Exemplary Embodiment

FIGS. 3 to 6 are sequence diagrams illustrating CLS executed by the communication system according to the present exemplary embodiment. For example, a CPU of an apparatus reads a program stored in a memory of the apparatus onto a RAM of the apparatus and executes the program to thereby realize a process illustrated in the sequence diagrams.

Figure 3:
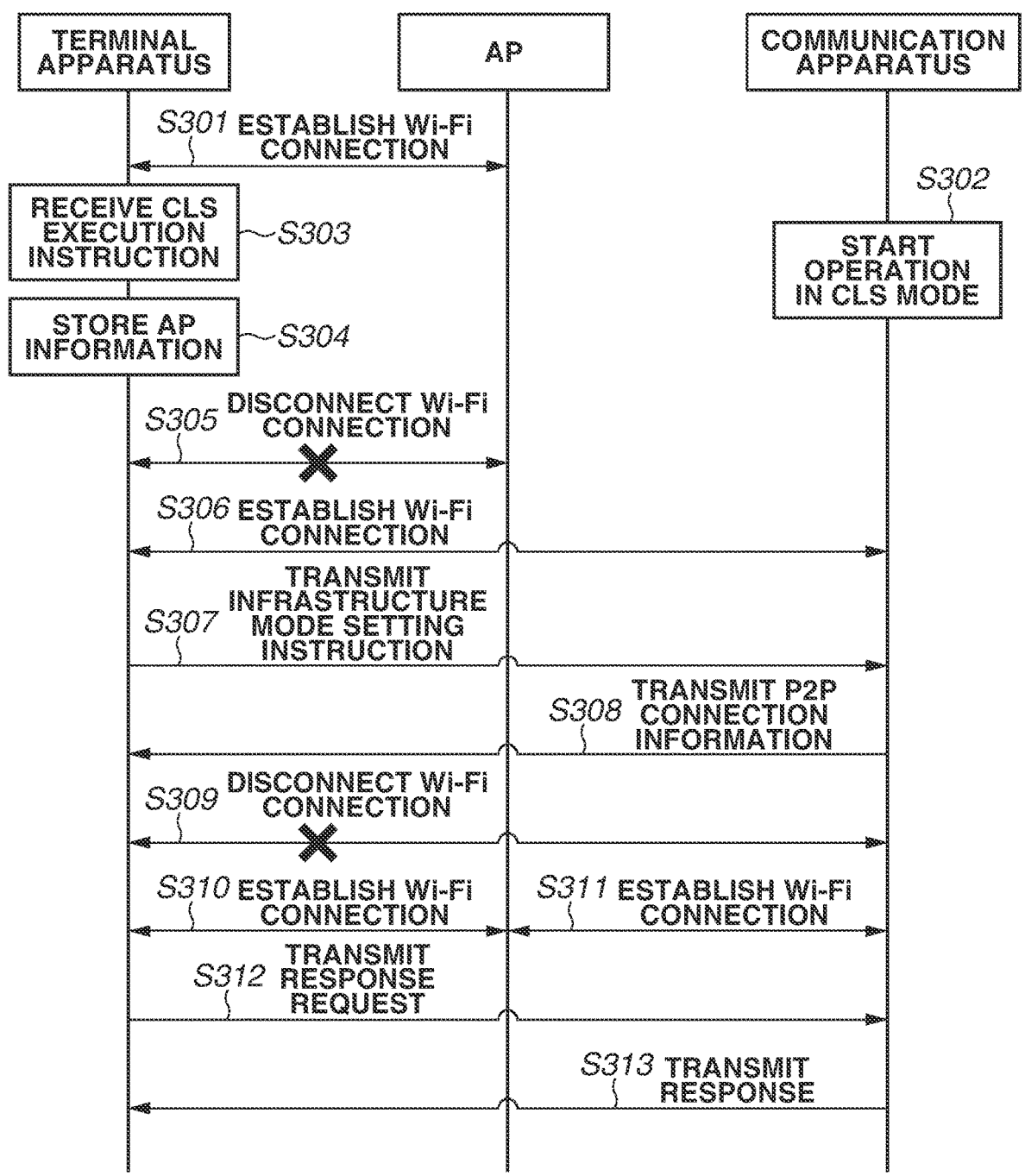
FIG. 3 illustrates an example of a sequence diagram illustrating a cableless setup that is executed by the communication system according to the exemplary embodiment.

First, the sequence diagram illustrated in FIG. 3 will be described. FIG. 3 is a sequence diagram illustrating CLS that is executed using Wi-Fi® communication between the terminal apparatus 101 and the communication apparatus 151. FIG. 3 is a sequence diagram illustrating CLS for connecting the communication apparatus 151 and the AP 131 with the privacy separator function set to OFF.

First, in step S301, the terminal apparatus 101 establishes a Wi-Fi® connection with the AP 131.

Next, in step S302, the communication apparatus 151 starts operation in the CLS mode. The CLS mode is a mode for executing CLS to set a connection setting of the communication apparatus 151. A trigger for a start of operation of the communication apparatus 151 in the CLS mode can be, for example, the press of a CLS mode button of the communication apparatus 151 by the user or activation (power on) of the communication apparatus 151 for the first time after an arrival.

If the communication apparatus 151 starts operation in the CLS mode, the communication apparatus 151 enables the internal AP (AP for CLS) in the communication apparatus 151 which is a dedicated AP for the CLS mode. This changes the communication apparatus 151 to a state in which the communication apparatus 151 can establish a P2P connection with the terminal apparatus 101 using Wi-Fi®. The connection information (SSID, password) for connecting to the AP for CLS is held in advance in the CLS application installed in the terminal apparatus 101, and the terminal apparatus 101 recognizes the connection information for connecting to the AP for CLS in advance. Thus, while the connection information about the AP that is enabled in the P2P mode can be changed by the user, the connection information about the AP for CLS cannot be changed as desired by the user. In the CLS mode, the communication apparatus 151 can connect to the terminal apparatus 101 using WFD instead of normal Wi-Fi®.

In the present exemplary embodiment, the communication apparatus 151 having started operation in the CLS mode enables the Bluetooth® Low Energy function and starts transmitting advertisement information. This changes the communication apparatus 151 to a state in which the communication apparatus 151 can establish a Bluetooth® Low Energy connection with the terminal apparatus 101.

Next, in step S303, the terminal apparatus 101 receives a CLS execution instruction from the user via a screen displayed on the display unit 108 by the CLS application.

Next, in step S304, the terminal apparatus 101 stores, in the memory, information about the AP (AP 131) that is connected when the CLS execution instruction is received. The information about the AP 131 is, for example, the connection information (SSID, password) for connecting to the AP 131 and information about a frequency and channel used in the connection with the AP 131.

Next, in step S305, the terminal apparatus 101 disconnects the Wi-Fi® connection established with the AP 131.

Next, in step S306, the terminal apparatus 101 establishes a Wi-Fi® connection with the AP for CLS in the communication apparatus 151 using the connection information for connecting to the AP for CLS that is recognized in advance. In this way, the terminal apparatus 101 temporarily establishes a P2P connection with the communication apparatus 151 using Wi-Fi®.

Next, in step S307, the terminal apparatus 101 transmits an infrastructure mode setting instruction to the communication apparatus 151 using Wi-Fi® (connection information transmission step). The infrastructure mode setting instruction contains, for example, the connection information for connecting to the AP 131 that is stored in the memory in step S304. At this time, the terminal apparatus 101 can receive user-input additional connection information (password, etc.) for connecting to the AP 131 and transmit the additional connection information as the infrastructure mode setting instruction to the communication apparatus 151.

Next, in step S308, the communication apparatus 151 transmits P2P connection information, which is connection information for connecting to the communication apparatus 151 operating in the P2P mode, to the terminal apparatus 101 using Wi-Fi®. Specifically, the terminal apparatus 101 receives the P2P connection information using Wi-Fi® (connection information reception step).

Next, in step S309, the terminal apparatus 101 disconnects the P2P connection established with the communication apparatus 151.

Next, in step S310, the terminal apparatus 101 re-establishes a Wi-Fi® connection with the AP 131 using the connection information for connecting to the AP 131 that is stored in the memory in step S304.

Next, in step S311, the communication apparatus 151 establishes a Wi-Fi® connection with the AP 131 based on the infrastructure mode setting instruction using the connection information for connecting to the AP 131 that is received in step S307. In this way, an infrastructure connection is established between the terminal apparatus 101 and the communication apparatus 151 via the AP 131. In the present exemplary embodiment, the communication apparatus 151 starts simultaneous operation in the case of receiving the infrastructure mode setting instruction. Specifically, the communication apparatus 151 starts operation in the infrastructure mode, connects to the AP 131, and then starts operation in the P2P mode, in order to start operation in the P2P mode after a communication channel for use in connecting to the AP 131 in the infrastructure mode is determined. The communication apparatus 151 executes control in such a manner that the communication channel used in connecting to the AP 131 in the infrastructure mode is also used in establishing a connection in the P2P mode. In a case where communication channel synchronization control is not to be executed, for example, the communication apparatus 151 can start operation in the P2P mode before starting operation in the infrastructure mode and connecting to the AP 131.

Next, in step S312, the terminal apparatus 101 transmits a response request to the communication apparatus 151 via the AP 131 using Wi-Fi® (request transmission step). Specifically, the terminal apparatus 101 designates the address of the communication apparatus 151 as the address of the transmission destination of the response request and transmits the response request to the AP 131. At this time, the privacy separator function of the AP 131 is set to OFF, so that if the AP 131 receives the response request from the terminal apparatus 101, the AP 131 relays the response request to the communication apparatus 151.

Next, in step S313, the communication apparatus 151 transmits a response to the terminal apparatus 101 in response to the received response request. Specifically, the communication apparatus 151 designates the address of the terminal apparatus 101 as the address of the transmission destination of the response and transmits the response to the AP 131. At this time, the privacy separator function of the AP 131 is set to OFF, so that if the AP 131 receives the response from the communication apparatus 151, the AP 131 relays the response to the terminal apparatus 101. The terminal apparatus 101 having received the response recognizes that communication with the communication apparatus 151 via the AP 131 is executable and thus ends the CLS.

Figure 4:
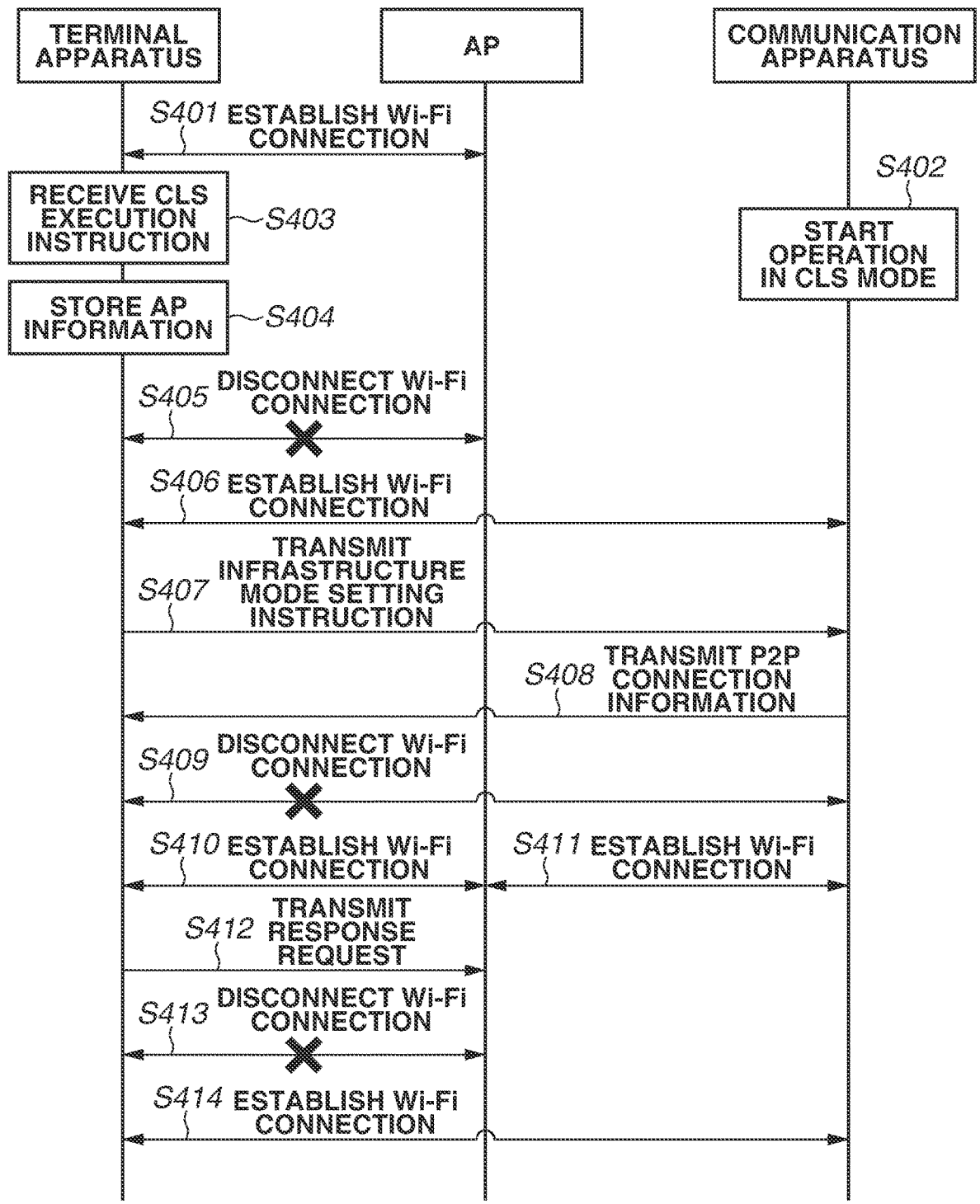
FIG. 4 illustrates an example of a sequence diagram illustrating a cableless setup that is executed by the communication system according to the exemplary embodiment.

Next, the sequence diagram illustrated in FIG. 4 will described. FIG. 4 is a sequence diagram illustrating CLS that is executed via Wi-Fi® communication between the terminal apparatus 101 and the communication apparatus 151. FIG. 4 is a sequence diagram illustrating CLS for connecting the communication apparatus 151 and the AP 131 with the privacy separator function set to ON.

Steps S401 to S411 are similar to steps S301 to S311, so that description thereof is omitted.

In step S412, the terminal apparatus 101 transmits a response request to the communication apparatus 151 via the AP 131 using Wi-Fi®. Specifically, the terminal apparatus 101 designates the address of the communication apparatus 151 as the address of the transmission destination of the response request and transmits the response request to the AP 131. However, at this time, the privacy separator function of the AP 131 is set to ON, so that if the AP 131 receives the response request from the terminal apparatus 101, the AP 131 does not relay the response request to the communication apparatus 151 which is an apparatus in the LAN. Thus, the response request does not reach the communication apparatus 151, and thus the communication apparatus 151 does not return a response to the terminal apparatus 101. If the terminal apparatus 101 does not receive a response even if a predetermined time or longer elapses from the transmission of the response request, the terminal apparatus 101 recognizes that communication with the communication apparatus 151 via the AP 131 is not executable.

Thus, in step S413, the terminal apparatus 101 disconnects the Wi-Fi® connection established with the AP 131.

Thereafter, in step S414, the terminal apparatus 101 establishes a P2P connection with the communication apparatus 151 using the P2P connection information received in step S408.

The above-described configuration makes it possible to set a setting so as to enable the terminal apparatus 101 and the communication apparatus 151 to communicate via a P2P connection even in a case where an infrastructure connection via an AP with the privacy separator function set to ON is set by the CLS.

In the present exemplary embodiment, the communication apparatus 151 is configured to perform simultaneous operation and maintains the connection established with the AP 131 even in the case where an infrastructure connection via an AP with the privacy separator function set to ON is set. This enables the communication apparatus 151 to use the Internet via the connection established with the AP 131 (to communicate with the external server 161) and to communicate with the terminal apparatus 101 via the P2P connection established with the terminal apparatus 101.

In the present exemplary embodiment, the communication apparatus 151 communicates with the external server 161 via the Internet to thereby receive, for example, a social networking service (SNS) provided from the external server 161. This enables the communication apparatus 151 to display an image uploaded to the SNS on the display unit 108 and print an image selected from the displayed images by the user. The communication apparatus 151 can receive, for example, information (error type and error solving method) about an error that occurs on the communication apparatus 151, or receive a service for updating the firmware of the communication apparatus 151 that is provided from the external server 161.

Figure 5:
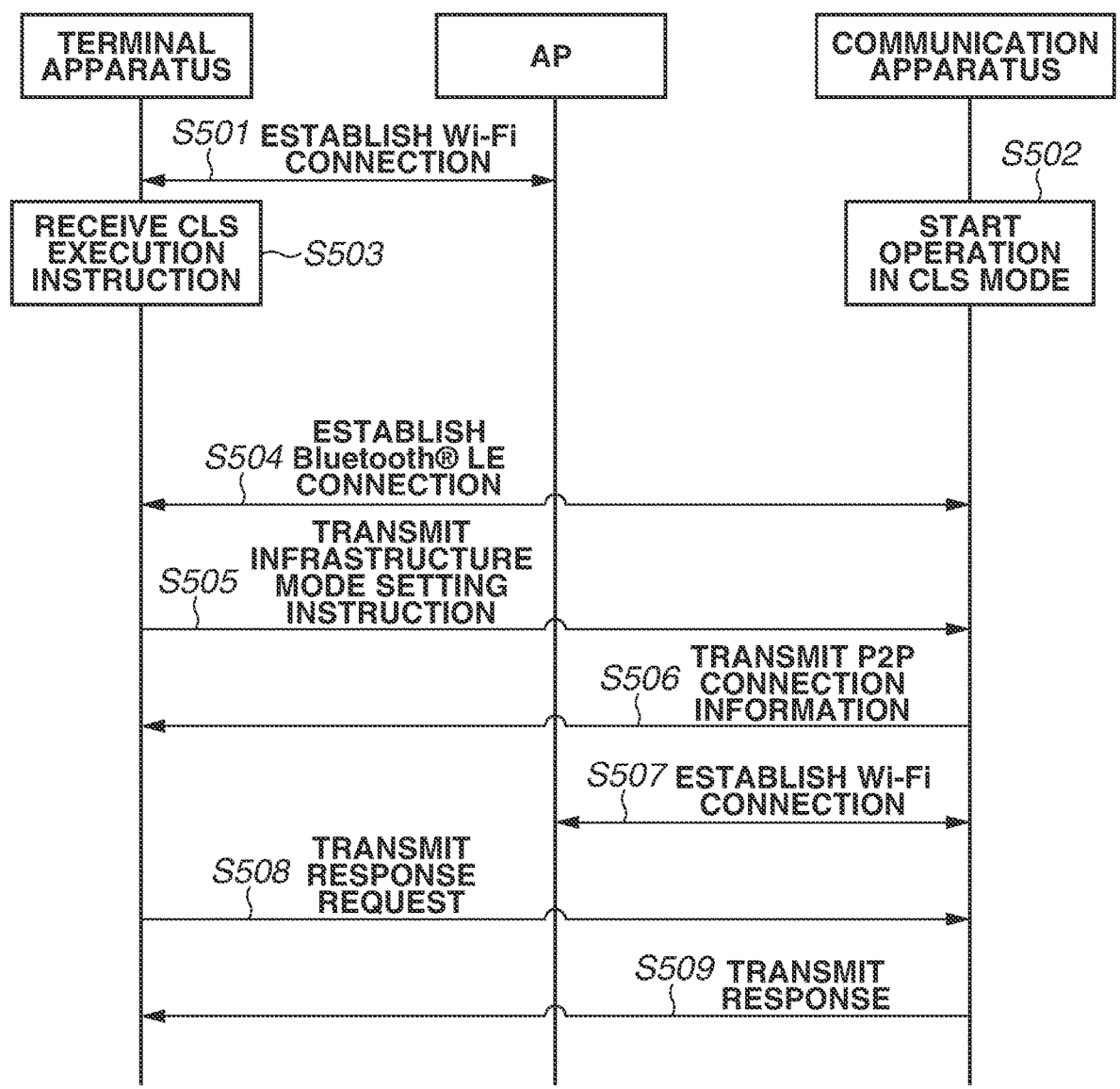
FIG. 5 illustrates an example of a sequence diagram illustrating a cableless setup that is executed by the communication system according to the exemplary embodiment.

Next, the sequence diagram illustrated in FIG. 5 will be described. FIG. 5 is a sequence diagram illustrating CLS that is executed via Bluetooth® Low Energy communication between the terminal apparatus 101 and the communication apparatus 151. FIG. 5 is a sequence diagram illustrating CLS for connecting the communication apparatus 151 and the AP 131 with the privacy separator function set to OFF.

Steps S501 to S503 are similar to steps S301 to S303, so that description thereof is omitted.

In step S504, the terminal apparatus 101 establishes a P2P connection with the communication apparatus 151 using Bluetooth® Low Energy.

Next, in step S505, the terminal apparatus 101 transmits an infrastructure mode setting instruction to the communication apparatus 151 using Bluetooth® Low Energy. The CLS using Bluetooth® Low Energy is different from the CLS using Wi-Fi® in that the terminal apparatus 101 can transmit the infrastructure mode setting instruction to the communication apparatus 151 without disconnecting the connection with the AP 131. At this time, the terminal apparatus 101 can receive user-input additional connection information (password, etc.) for connecting to the AP 131 and transmit the additional connection information as the infrastructure mode setting instruction to the communication apparatus 151.

Next, in step S506, the communication apparatus 151 transmits the P2P connection information, which is connection information for connecting to the communication apparatus 151 operating in the P2P mode, to the terminal apparatus 101 using Bluetooth® Low Energy.

Next, in step S507, the communication apparatus 151 establishes a Wi-Fi® connection with the AP 131 using the connection information for connecting to the AP 131 that is received in step S505. In this way, an infrastructure connection is established between the terminal apparatus 101 and the communication apparatus 151 via the AP 131. In the case where the Wi-Fi® connection is established with the AP 131, the communication apparatus 151 can transmit information indicating that the Wi-Fi® connection is successfully established with the AP 131 to the terminal apparatus 101 using Bluetooth® Low Energy. For example, in a case where the Wi-Fi® connection with the AP 131 is not successfully established due to incorrect connection information received in step S505, the communication apparatus 151 can transmit information indicating that the Wi-Fi® connection with the AP 131 is not successfully established to the terminal apparatus 101 using Bluetooth® Low Energy.

Steps S508 and S509 are similar to steps S312 and S313, so that description thereof is omitted.

As described above, in the CLS using Bluetooth® Low Energy, the terminal apparatus 101 does not have to change the Wi-Fi® connection destination, so that the number of processing is less than that in the CLS using Wi-Fi®. Thus, the terminal apparatus 101 can promptly complete the setup of the communication apparatus 151 through the CLS using Bluetooth® Low Energy.

Figure 6:
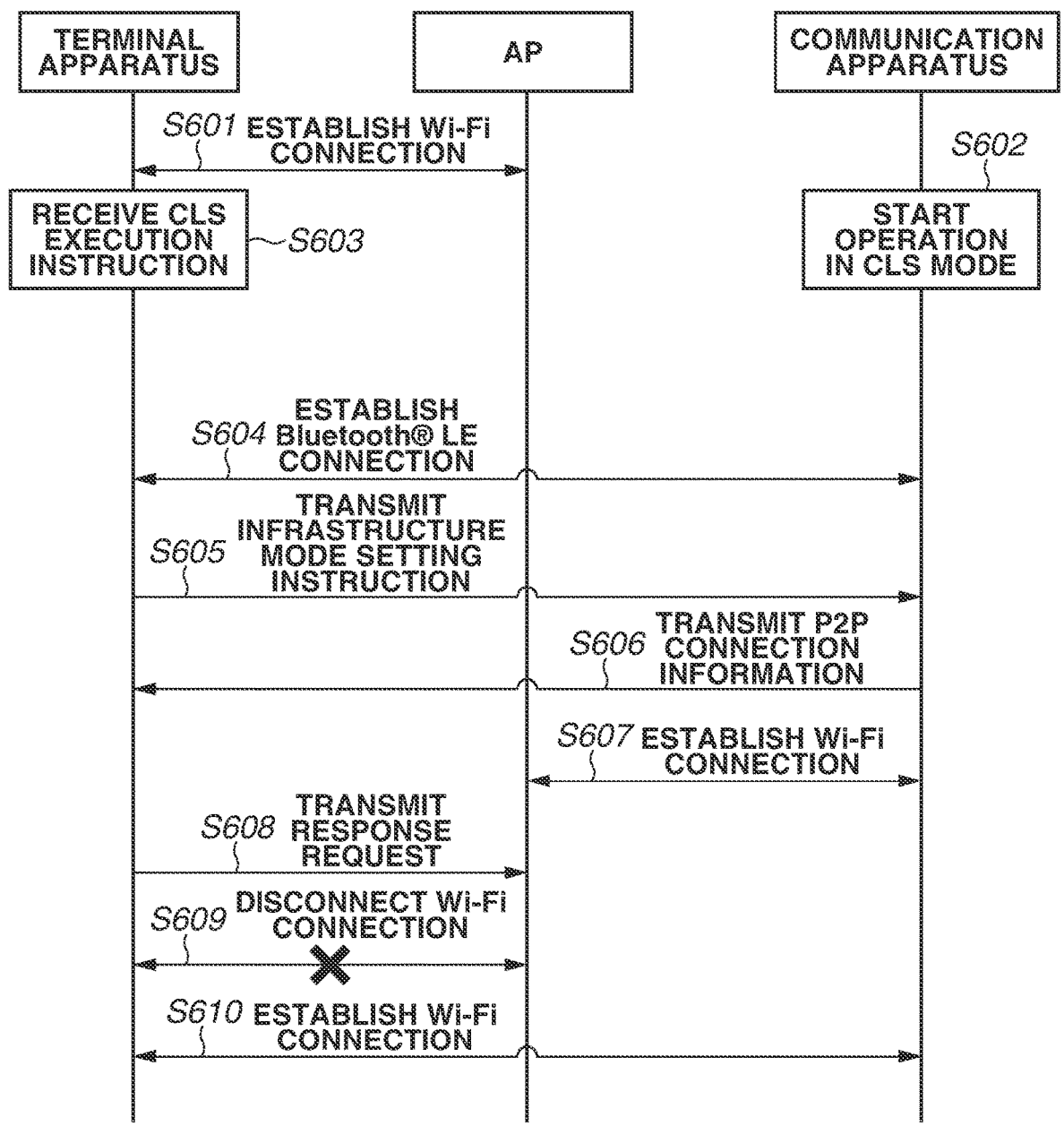
FIG. 6 illustrates an example of a sequence diagram illustrating a cableless setup that is executed by the communication system according to the exemplary embodiment.

Next, the sequence diagram illustrated in FIG. 6 will be described. FIG. 6 is a sequence diagram illustrating CLS that is executed via Bluetooth® Low Energy communication between the terminal apparatus 101 and the communication apparatus 151. FIG. 6 is a sequence diagram illustrating CLS for connecting the communication apparatus 151 and the AP 131 with the privacy separator function set to ON.

Steps S601 to S607 are similar to steps S501 to S507 and steps S608 to S610 are similar to steps S412 to S414, so that description thereof is omitted.

As described above, even in the case where the infrastructure connection via the AP with the privacy separator function set to ON is set in the CLS using Bluetooth® Low Energy, the setting can be set so as to enable the terminal apparatus 101 and the communication apparatus 151 to communicate with each other.

Meanwhile, in the sequence diagrams illustrated in FIGS. 3 and 5, the privacy separator function of the AP 131 is set to OFF, so that the terminal apparatus 101 and the communication apparatus 151 can communicate via the infrastructure connection. In this case, the communication apparatus 151 does not have to execute operation in the P2P mode. Thus, in a case where, for example, the terminal apparatus 101 and the communication apparatus 151 can communicate via the infrastructure connection, the communication apparatus 151 can cancel the simultaneous operation and stop the operation in the P2P mode.

Figure 7:
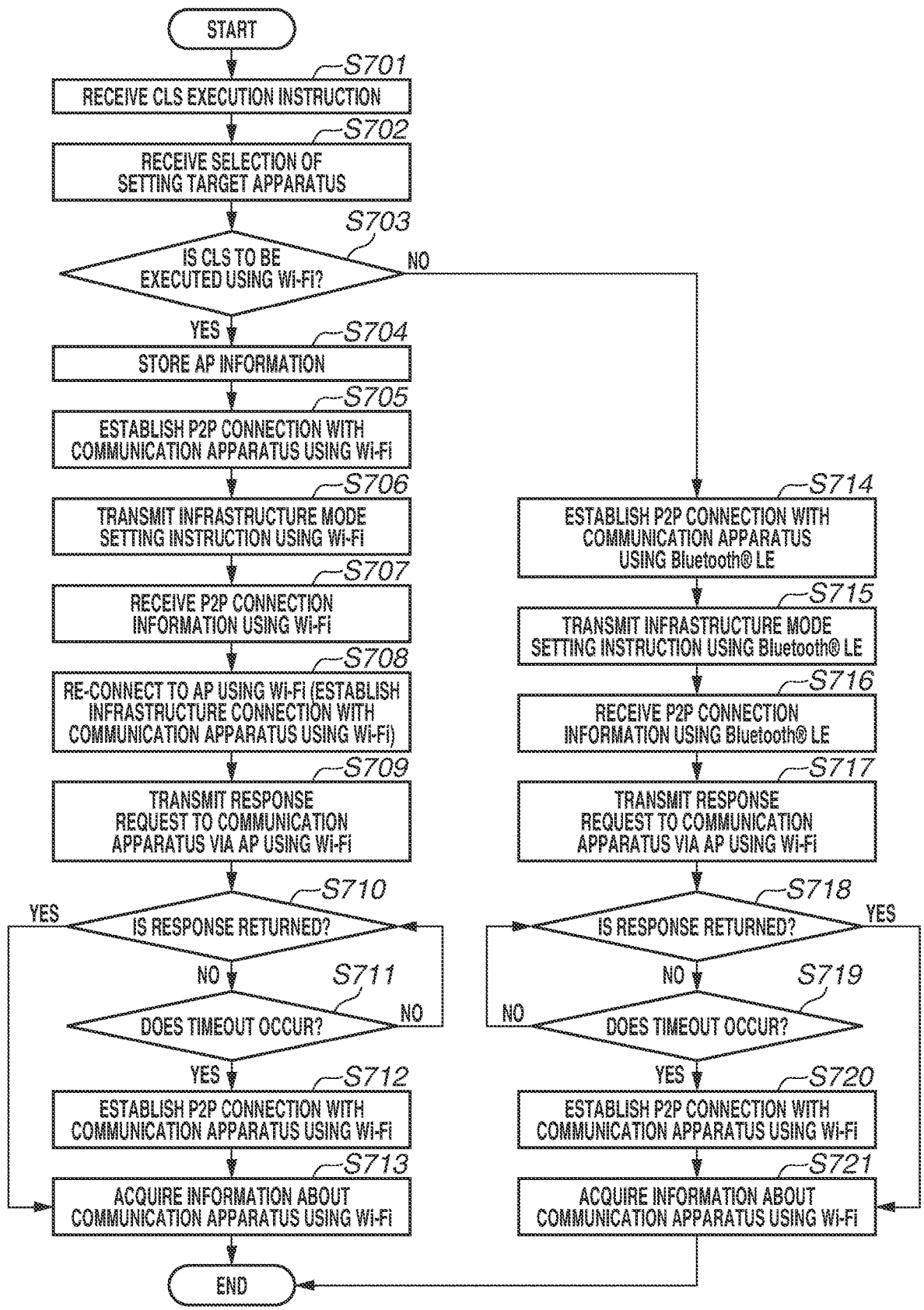
FIG. 7 is a flowchart illustrating a cableless setup that is executed by the terminal apparatus according to the exemplary embodiment.

FIG. 7 is a flowchart illustrating CLS that is executed by the terminal apparatus 101. For example, the CPU 103 reads a program (CLS application, etc.) stored in the memory such as the ROM 104 onto the RAM 105 and executes the program to thereby realize the process illustrated in the flowchart. The process illustrated in the flowchart is started in the state in which the terminal apparatus 101 and the AP 131 are Wi-Fi® connected. While the process illustrated in the flowchart is executed in the state in which the CLS application is activated on the terminal apparatus 101, the Wi-Fi® connection between the terminal apparatus 101 and the AP 131 can be established in a state in which the CLS application is not activated on the terminal apparatus 101.

First, in step S701, the terminal apparatus 101 receives a CLS execution instruction from the user. Step S701 corresponds to step S303.

Next, in step S702, the terminal apparatus 101 receives a user-selected setting target apparatus from the user. Specifically, if the execution instruction is received in step S701, the terminal apparatus 101 first searches for an apparatus operating in the CLS mode. The apparatus operating in the CLS mode usually enables the AP for CLS and enables the Bluetooth® Low Energy function. Thus, the terminal apparatus 101 searches for an apparatus operating in the CLS mode by acquiring a beacon corresponding to the AP for CLS and advertisement information corresponding to the CLS mode. Then, the terminal apparatus 101 displays a list of detected apparatuses on the display unit 108 and prompts the user to select a setting target apparatus from the list. The terminal apparatus 101 can be Bluetooth® Low Energy connected to an apparatus prior to step S701, and the list can include the apparatus to which terminal apparatus 101 is Bluetooth® Low Energy connected. In a case where only one apparatus is detected, step S702 can be omitted, and the detected one apparatus can automatically be determined as a setting target apparatus and the subsequent processing can be executed. In a case where the beacon corresponding to the AP for CLS and the advertisement information corresponding to the CLS mode are both acquired from the same apparatus, the list can contain the two pieces of information corresponding to the same apparatus. Hereinafter, a case where the communication apparatus 151 is selected as a setting target apparatus will be described.

Next, in step S703, the terminal apparatus 101 determines whether CLS is to be executed using Wi-Fi®. As described above, in the present exemplary embodiment, the terminal apparatus 101 can execute CLS using Bluetooth® Low Energy as well as CLS using Wi-Fi®. The terminal apparatus 101 executes the determination by determining whether the setting target apparatus corresponds to the CLS using Bluetooth® Low Energy or the CLS using Wi-Fi®. For example, if the apparatus displayed based on the acquisition of the beacon corresponding to the AP for CLS is selected by the user in step S702 (YES in step S703), the terminal apparatus 101 determines that the CLS using Wi-Fi® is to be executed. For example, if the apparatus displayed based on the acquisition of the advertisement information corresponding to the CLS mode or the apparatus displayed based on the establishment of the Bluetooth® Low Energy connection with the terminal apparatus 101 is selected by the user in step S702 (NO in step S703), the terminal apparatus 101 determines that CLS using Wi-Fi® is not to be executed. In the case where the terminal apparatus 101 determines that CLS using Wi-Fi® is to be executed (YES in step S703), the processing proceeds to step S704, and the terminal apparatus 101 executes CLS using Wi-Fi®. In the case where the terminal apparatus 101 determines that CLS using Wi-Fi® is not to be executed (NO in step S703), the processing proceeds to step S714, and the terminal apparatus 101 executes CLS using Bluetooth® Low Energy.

The process after the terminal apparatus 101 determines that CLS using Wi-Fi® is to be executed in step S703 will be described. In step S704, the terminal apparatus 101 stores information about the currently-connected AP (AP 131) in the memory. Step S704 corresponds to step S304.

Next, in step S705, the terminal apparatus 101 disconnects the connection with the AP 131 and thereafter transmits a Wi-Fi® connection request to the internal AP for CLS in the communication apparatus 151 and establishes a P2P connection with the communication apparatus 151 using Wi-Fi®. Step S305 corresponds to step S306.

Next, in step S706, the terminal apparatus 101 transmits an infrastructure mode setting instruction to the communication apparatus 151 using Wi-Fi®. Step S706 corresponds to step S307.

Next, in step S707, the terminal apparatus 101 receives the P2P connection information from the communication apparatus 151 using Wi-Fi®. Step S707 corresponds to step S308.

Next, in step S708, the terminal apparatus 101 disconnects the Wi-Fi® connection established with the communication apparatus 151 and thereafter re-connects to the AP 131 using Wi-Fi®. Step S708 corresponds to steps S309 and S310.

Next, in step S709, the terminal apparatus 101 transmits a response request to the communication apparatus 151 via the AP 131 using Wi-Fi®. Step S709 corresponds to steps S312 and S412.

Next, in step S710, the terminal apparatus 101 determines whether a response from the communication apparatus 151 is received. The terminal apparatus 101 executes step S710 to determine whether communication with the communication apparatus 151 via the AP 131 is executable. If the terminal apparatus 101 determines that a response from the communication apparatus 151 is received (YES in step S710), the processing proceeds to step S713. On the other hand, if the terminal apparatus 101 determines that no response from the communication apparatus 151 is received (NO in step S710), the processing proceeds to step S711.

In step S711, the terminal apparatus 101 determines whether a predetermined time lapsed (whether a timeout occurs) from the transmission of the response request. If the terminal apparatus 101 determines that a timeout occurs (YES in step S711), the processing proceeds to step S712. On the other hand, if the terminal apparatus 101 determines that no timeout occurs (NO in step S711), the processing returns to step S710.

In step S712, the terminal apparatus 101 disconnects the connection established with the AP 131 and thereafter establishes a P2P connection with the communication apparatus 151 using the P2P connection information received in step S707. Step S712 corresponds to steps S413 and S414. At this time, the terminal apparatus 101 can notify the user that communication with the communication apparatus 151 via the AP 131 is not executable or that the privacy separator function of the AP 131 is set to ON. For example, the terminal apparatus 101 can first receive user input and then prompt the user to select whether to establish a P2P connection between the terminal apparatus 101 and the communication apparatus 151. Then, the terminal apparatus 101 can execute step S712 in a case where the user selects that the P2P connection is to be established, and the terminal apparatus 101 can end the process without executing step S712 in a case where the user does not select that the P2P connection is to be established.

In step S713, the terminal apparatus 101 acquires information about the communication apparatus 151 from the communication apparatus 151 via the Wi-Fi® connection (infrastructure connection or P2P connection) established with the communication apparatus 151. The information about the communication apparatus 151 is, for example, the media access control (MAC) address of the communication apparatus 151, information about an error state of the communication apparatus 151, and information about the remaining amount of a recording agent or recording medium stored in the communication apparatus 151. In this way, the communication apparatus 151 is registered in the CLS application, and thereafter the terminal apparatus 101 can transmit a print job and scan job to the communication apparatus 151. Thereafter, the terminal apparatus 101 ends the process.

The process after the terminal apparatus 101 determines that CLS using Wi-Fi® is not to be executed (CLS using Bluetooth® Low Energy is to be executed) in step S703 will be described. In step S714, the terminal apparatus 101 establishes a P2P connection with the communication apparatus 151 using Bluetooth® Low Energy by transmitting a Bluetooth® Low Energy connection request to the communication apparatus 151 in response to the received advertisement information. In a case where a Bluetooth® Low Energy connection is already established with the communication apparatus 151, step S714 is skipped.

Next, in step S715, the terminal apparatus 101 transmits an infrastructure mode setting instruction to the communication apparatus 151 using Bluetooth® Low Energy. Step S715 corresponds to step S505.

Next, in step S716, the terminal apparatus 101 receives the P2P connection information from the communication apparatus 151 using Bluetooth® Low Energy. Step S716 corresponds to step S506.

Next, in step S717, the terminal apparatus 101 transmits a response request to the communication apparatus 151 via the AP 131 using Wi-Fi®. Step S717 corresponds to steps S508 and S608. The terminal apparatus 101 can execute step S717 based on the acquisition of information indicating that a Wi-Fi® connection is successfully established with the AP 131 from the communication apparatus 151 using Bluetooth® Low Energy. In a case where the terminal apparatus 101 receives information indicating that a Wi-Fi® connection is not successfully established with the AP 131 from the communication apparatus 151 using Bluetooth® Low Energy, the terminal apparatus 101 can display the information on the display unit 108 without executing step S717 and return to step S715. Then, the terminal apparatus 101 can transmit the connection information again after the user-input connection information is received.

Next, in step S718, the terminal apparatus 101 determines whether a response from the communication apparatus 151 is received. The terminal apparatus 101 executes step S718 to thereby determine whether communication with the communication apparatus 151 via the AP 131 is executable. If the terminal apparatus 101 determines that a response from the communication apparatus 151 is received (YES in step S718), the processing proceeds to step S721. On the other hand, if the terminal apparatus 101 determines that no response from the communication apparatus 151 is received (NO in step S718), the processing proceeds to step S719.

In step S719, the terminal apparatus 101 determines whether a predetermined time lapsed (whether a timeout occurs) from the transmission of the response request. If the terminal apparatus 101 determines that a timeout occurs (YES in step S719), the processing proceeds to step S720. On the other hand, if the terminal apparatus 101 determines that no timeout occurs (NO in step S719), the processing returns to step S718.

In step S720, the terminal apparatus 101 disconnects the Wi-Fi® connection established with the AP 131 and thereafter establishes a P2P connection with the communication apparatus 151 using the P2P connection information received in step S707. Step S720 corresponds to steps S609 and S610. At this time, the terminal apparatus 101 can notify the user that communication with the communication apparatus 151 via the AP 131 is not executable or that the privacy separator function of the AP 131 is set to ON. For example, the terminal apparatus 101 can first receive user input and then prompt the user to select whether to establish a P2P connection between the terminal apparatus 101 and the communication apparatus 151. Then, the terminal apparatus 101 can execute step S720 in a case where the user selects that the P2P connection is to be established, or the terminal apparatus 101 can end the process without executing step S720 in a case where the user selects that the P2P connection is not to be established.

In step S721, the terminal apparatus 101 acquires information about the communication apparatus 151 via the Wi-Fi® connection (infrastructure connection or P2P connection) established with the communication apparatus 151. In this way, the communication apparatus 151 is registered in the CLS application. Thereafter, the process is ended.

FIG. 8 is a flowchart illustrating CLS that is executed by the communication apparatus 151. For example, the CPU 154 reads a program stored in the memory such as the ROM 152 onto the RAM 153 and executes the program to thereby realize the process illustrated in the flowchart.

First, in step S801, the communication apparatus 151 starts operation in the CLS mode. Step S801 corresponds to step S302.

Next, in step S802, the communication apparatus 151 determines whether CLS using Wi-Fi® is to be executed. Specifically, for example, the communication apparatus 151 determines whether a Wi-Fi® connection request is received from the terminal apparatus 101 or a Bluetooth® Low Energy connection request is received from the terminal apparatus 101. If the communication apparatus 151 receives a Wi-Fi® connection request from the terminal apparatus 101 and determines that CLS using Wi-Fi® is to be executed (YES in step S802), the processing proceeds to step S803, and the communication apparatus 151 executes CLS using Wi-Fi®. If the communication apparatus 151 receives a Bluetooth® Low Energy connection request from the terminal apparatus 101 and determines that no CLS using Wi-Fi® is to be executed (NO in step S802), the processing proceeds to step S813, and the communication apparatus 151 executes CLS using Bluetooth® Low Energy.

The process after the communication apparatus 151 determines that CLS using Wi-Fi® is to be executed in step S802 will be described. In step S803, the communication apparatus 151 establishes a P2P connection with the terminal apparatus 101 using Wi-Fi® based on the reception of the Wi-Fi® connection request from the terminal apparatus 101. Step S803 corresponds to step S306.

Next, in step S804, the communication apparatus 151 receives an infrastructure mode setting instruction from the terminal apparatus 101 using Wi-Fi®. Step S804 corresponds to step S307.

Next, in step S805, the communication apparatus 151 transmits the P2P connection information to the terminal apparatus 101 using Step S805 corresponds to step S308.

Next, in step S806, the communication apparatus 151 starts simultaneous operation. Specifically, the communication apparatus 151 first starts operation in the infrastructure mode and establishes a Wi-Fi® connection with the AP 131 based on the infrastructure mode setting instruction. Thereafter, the communication apparatus 151 starts operation in the P2P mode while maintaining the operation in the infrastructure mode. The P2P mode activated at this time is a mode in which a P2P connection is executed using a communication channel (frequency band) that is used in connecting to the AP 131. Step S806 corresponds to step S311.

Next, in step S807, the communication apparatus 151 determines whether a response request is received from the terminal apparatus 101. If the communication apparatus 151 determines that a response request is received from the terminal apparatus 101 (YES in step S807), the processing proceeds to step S810. On the other hand, if the communication apparatus 151 determines that no response request is received from the terminal apparatus 101 (NO in step S807), the processing proceeds to step S808.

In step S808, the communication apparatus 151 determines whether a P2P connection is established with the terminal apparatus 101. If the communication apparatus 151 determines that a P2P connection is established with the terminal apparatus 101 (YES in step S808), the processing proceeds to step S809. On the other hand, if the communication apparatus 151 determines that no P2P connection is established with the terminal apparatus 101 (NO in step S808), the processing returns to step S807.

In step S809, the communication apparatus 151 transmits the information about the communication apparatus 151 to the terminal apparatus 101 via the Wi-Fi® connection (P2P connection) established with the terminal apparatus 101. Thereafter, the process is ended.

In step S810, the communication apparatus 151 transmits a response to the terminal apparatus 101 using Wi-Fi® in response to the received response request. Step S810 corresponds to step S313.

Next, in step S811, the communication apparatus 151 transmits the information about the communication apparatus 151 to the terminal apparatus 101 via the Wi-Fi® connection (infrastructure connection) established with the terminal apparatus 101.

Next, in step S812, the communication apparatus 151 cancels the simultaneous operation and stops the operation in the P2P mode. Thereafter, the communication apparatus 151 ends the process.

The process after the communication apparatus 151 determines that no CLS using Wi-Fi® is to be executed (CLS using Bluetooth® Low Energy is to be executed) in step S802 will be described. In step S813, the communication apparatus 151 establishes a P2P connection with the terminal apparatus 101 using Bluetooth® Low Energy based on the reception of the Bluetooth® Low Energy connection request from the terminal apparatus 101. Step S813 corresponds to step S504.

Next, in step S814, the communication apparatus 151 receives the infrastructure mode setting instruction from the terminal apparatus 101 using Bluetooth® Low Energy. Step S814 corresponds to step S505.

Next, in step S815, the communication apparatus 151 transmits the P2P connection information to the terminal apparatus 101 using Bluetooth® Low Energy. Step S815 corresponds to step S506.

Next, in step S816, the communication apparatus 151 starts simultaneous operation.

Next, in step S817, the communication apparatus 151 determines whether a response request is received from the terminal apparatus 101. If the communication apparatus 151 determines that a response request is received from the terminal apparatus 101 (YES in step S817), the processing proceeds to step S820. On the other hand, if the communication apparatus 151 determines that no response request is received from the terminal apparatus 101 (NO in step S817), the processing proceeds to step S818. Alternatively, the communication apparatus 151 can receive the response request using, for example, Bluetooth® Low Energy.

In step S818, the communication apparatus 151 determines whether a P2P connection is established with the terminal apparatus 101. If the communication apparatus 151 determines that a P2P connection is established with the terminal apparatus 101 (YES in step S818), the processing proceeds to step S819. On the other hand, if the communication apparatus 151 determines that no P2P connection is established with the terminal apparatus 101 (NO in step S818), the processing returns to step S817.

In step S819, the communication apparatus 151 transmits the information about the communication apparatus 151 to the terminal apparatus 101 via the Wi-Fi® connection (P2P connection) established with the terminal apparatus 101. Thereafter, the process is ended.

In step S820, the communication apparatus 151 transmits a response to the terminal apparatus 101 using Wi-Fi® in response to the received response request. Step S820 corresponds to step S509.

Next, in step S821, the communication apparatus 151 transmits the information about the communication apparatus 151 to the terminal apparatus 101 via the Wi-Fi® connection (infrastructure connection) established with the terminal apparatus 101. Alternatively, the communication apparatus 151 can transmit the information about the communication apparatus 151 using, for example, Bluetooth® Low Energy.

Next, in step S822, the communication apparatus 151 cancels the simultaneous operation and stops the operation in the P2P mode. Thereafter, the process is ended.

The above-described configuration makes it possible to set a setting so as to enable the terminal apparatus 101 and the communication apparatus 151 to communicate via a P2P connection even in the case where an infrastructure connection via an AP with the privacy separator function set to ON is set by the CLS.

In the present exemplary embodiment, the communication apparatus 151 is configured to perform simultaneous operation and maintains the connection established with the AP 131 even in the case where an infrastructure connection via an AP with the privacy separator function set to ON is set. This enables the communication apparatus 151 to use the Internet via the connection established with the AP 131 (to communicate with the external server 161) and to communicate with the terminal apparatus 101 via the P2P connection established with the terminal apparatus 101.

In the present exemplary embodiment, the communication apparatus 151 executes both CLS using Wi-Fi® and CLS using Bluetooth® Low Energy. Thus, the communication apparatus 151 can execute CLS with an apparatus supporting only Wi-Fi® and also with an apparatus supporting both Wi-Fi® and Bluetooth® Low Energy. In the CLS with an apparatus supporting both Wi-Fi® and Bluetooth® Low Energy, prompt completion of the setup is possible.

Other Exemplary Embodiment

A configuration for solving the problem that the AP 131 does not relay communication between the terminal apparatus 101 and the communication apparatus 151 due to the privacy separator function is described above. There are cases in which, for example, an AP does not relay communication between apparatuses due to a SSID separator function in which the AP does not relay communication between apparatuses having different SSIDs. There are also cases in which an AP does not relay communication between apparatuses due to a function such as an "isolate" function, "AP isolation" function, "network separation function", "separation in SSID", or "isolation function". As described above, there are cases in which the AP 131 does not relay communication between the terminal apparatus 101 and the communication apparatus 151 due to a function other than the privacy separator function. The problem that a terminal apparatus and a communication apparatus cannot communicate via an external apparatus due to the functions is also solved by the control described in the above-described exemplary embodiment.

Even when the AP 131 does not relay communication between the terminal apparatus 101 and the communication apparatus 151 due to the SSID separator function, it is not always the case that the AP 131 does not relay communication between the communication apparatus 151 and an apparatus other than the terminal apparatus 101. For example, there are cases in which the communication apparatus 151 can communicate with an apparatus that belongs to the same LAN as the communication apparatus 151 and has the same SSID as the communication apparatus 151 even if the AP 131 does not relay communication between the communication apparatus 151 and the terminal apparatus 101 due to the SSID separator function. Thus, the communication apparatus 151 establishes a new connection with the terminal apparatus 101 while maintaining the connection with the AP 131 even in the case where the AP 131 does not relay communication between the terminal apparatus 101 and the communication apparatus 151 due to the SSID separator function.

Specifically, the control described in the above-described exemplary embodiment is configured to solve the problem that communication with the communication apparatus 151 via an infrastructure connection cannot be executed although the terminal apparatus 101 executes processing to connect the AP 131 and the communication apparatus 151. The cause of the problem that communication with the communication apparatus 151 via an infrastructure connection cannot be executed can be the privacy separator function or any other cause.

While the arrangement in which CLS is executed to operate the communication apparatus 151 in the infrastructure mode in the case where the privacy separator function of the AP 131 is set to OFF is described above, the arrangement is not limited to that described above. Alternatively, CLS can be executed to operate the communication apparatus 151 in the P2P mode regardless of whether the privacy separator function of the AP 131 is set to OFF. For example, the terminal apparatus 101 displays a setting screen 900 illustrated in FIG. 9 on the display unit 108. If an infrastructure connection start button 902 is selected by the user, the terminal apparatus 101 executes the process illustrated in FIG. 7 and preferentially sets the infrastructure mode to the communication apparatus 151, as described above in the exemplary embodiment. If a P2P connection start button 903 is selected by the user, the terminal apparatus 101 does not transmit an infrastructure mode setting instruction to the communication apparatus 151 but transmits a P2P mode setting instruction. Specifically, the terminal apparatus 101 preferentially sets the P2P mode to the communication apparatus 151. The communication apparatus 151 having received the P2P mode setting instruction operates in the P2P mode without connecting to the AP 131. If an automatic connection start button 809 is selected by the user, the terminal apparatus 101 automatically selects whether CLS is to be executed to operate the communication apparatus 151 in the infrastructure mode or to operate the communication apparatus 151 in the P2P mode. Specifically, in a case where the terminal apparatus 101 is Wi-Fi® connected to an AP, the terminal apparatus 101 selects that the communication apparatus 151 is to be operated in the infrastructure mode, and the terminal apparatus 101 executes the process illustrated in FIG. 7. On the other hand, in a case where the terminal apparatus 101 is not Wi-Fi® connected to any AP, the terminal apparatus 101 selects that the communication apparatus 151 is to be operated in the P2P mode, and the terminal apparatus 101 transmits a P2P mode setting instruction to the communication apparatus 151. The setting screen 900 can include, for example, a region 901 for notifying the user that the communication apparatus 151 is to be changed to the CLS mode.

While the arrangement of operating the communication apparatus 151 in the infrastructure mode using the AP to which the terminal apparatus 101 is connected is described above, the arrangement is not limited to that described above. For example, the communication apparatus 151 can be operated in the infrastructure mode using an AP to which the terminal apparatus 101 is not connected. For example, the terminal apparatus 101 displays a list of APs to which the communication apparatus 151 is to be connected on the display unit 108. The list can be a list of APs detected by the terminal apparatus 101 using Wi-Fi® or can be a list of APs detected by the communication apparatus 151 using Wi-Fi®. In the latter case, the terminal apparatus 101 acquires information about the list of APs detected by the communication apparatus 151 using Wi-Fi® via the Bluetooth® Low Energy connection established with the communication apparatus 151. Then, the terminal apparatus 101 receives user-selection of an AP from the list and user-input connection information (password, etc.) for connecting to the user-selected AP and transmits an infrastructure mode setting instruction containing the connection information to the communication apparatus 151. In this way, the terminal apparatus 101 can operate the communication apparatus 151 in the infrastructure mode using an AP to which the terminal apparatus 101 is not connected. In a case where, for example, the terminal apparatus 101 is connected to an AP, the terminal apparatus 101 can preferentially connect the connected AP to the communication apparatus 151. In a case where the terminal apparatus 101 is not connected to any AP, the terminal apparatus 101 can preferentially connect the AP selected from the list as described above to the communication apparatus 151.

While the process in which the terminal apparatus 101 transmits a response request to the communication apparatus 151 and determines whether communication is executable between the terminal apparatus 101 and the communication apparatus 151 via the AP 131, the process is not limited to that described above. For example, the communication apparatus 151 can transmit a response request to the terminal apparatus 101 in order to execute the determination. In this case, if a response is received from the terminal apparatus 101 before a timeout occurs, the communication apparatus 151 determines that communication is executable between the terminal apparatus 101 and the communication apparatus 151 via the AP 131. If no response is received from the terminal apparatus 101 before a timeout occurs, the communication apparatus 151 determines that communication is not executable between the terminal apparatus 101 and the communication apparatus 151 via the AP 131. Then, the communication apparatus 151 transmits a result of the determination to the terminal apparatus 101 via Bluetooth® Low Energy communication, and the terminal apparatus 101 determines to maintain the infrastructure connection or to establish a new P2P connection based on the received determination result.

While the communication apparatus 151 always executes simultaneous operation in the case of receiving the infrastructure mode setting instruction in the above-described arrangement, the arrangement is not limited to that described above. For example, the communication apparatus 151 can receive the result of the determination of whether communication is executable between the terminal apparatus 101 and the communication apparatus 151 via the AP 131 (step S710 and step S718) via Bluetooth® Low Energy communication. Then, the communication apparatus 151 starts operation in the P2P mode if the determination result indicates that communication is not executable between the terminal apparatus 101 and the communication apparatus 151 via the AP 131, whereas the communication apparatus 151 does not have to start operation in the P2P mode if the determination result indicates that communication is executable between the terminal apparatus 101 and the communication apparatus 151 via the AP 131. In an arrangement in which the communication apparatus 151 is configured to execute the determination, the communication apparatus 151 can select whether to start operation in the P2P mode based on the result of the determination performed by the communication apparatus 151.

The above-described exemplary embodiment is also realizable by a process in which a program for realizing one or more functions of the above-described exemplary embodiment is supplied to a system or apparatus via a network or storage medium and one or more processors of a computer of the system or apparatus execute the program. The above-described exemplary embodiment is also realizable by a circuit (e.g., application-specific integrated circuit (ASIC)) configured to realize one or more functions.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-085293, filed Apr. 26, 2018, which is hereby incorporated by reference herein in its entirety.

What is claimed is:

1. A method for controlling a communication system including a terminal apparatus and a communication apparatus, the method comprising:
    establishing a first connection between the communication apparatus and an external apparatus located external to the terminal apparatus and external to the communication apparatus;
    determining, in a state where the communication apparatus and the terminal apparatus are connected to a same apparatus that is the external apparatus as a result of the establishing the first connection, whether communication between the communication apparatus and the terminal apparatus via the external apparatus is executable; and
    establishing, in a state in which the established first connection is maintained, a second connection between the terminal apparatus and the communication apparatus without intervention of the external apparatus based on a determination that communication between the communication apparatus and the terminal apparatus via the external apparatus is not executable,
    wherein the external apparatus includes a privacy separator function,
    wherein, in the state in which the communication apparatus and the terminal apparatus are connected to the external apparatus as a result of establishing the first connection, the terminal apparatus and the communication apparatus belong to the same local area network, and
    wherein an apparatus other than the terminal apparatus that communicates with the communication apparatus via the first connection does not belong to the local area network to which the terminal apparatus and the communication apparatus belong.

2. The method according to claim 1, further comprising enabling an internal access point in the communication apparatus,
    wherein the second connection is a connection between the terminal apparatus and the communication apparatus via the enabled internal access point.

3. The method according to claim 2, further comprising disabling the internal access point in a case where the second connection is not established as a result of the determination that communication between the communication apparatus and the terminal apparatus via the external apparatus is not executable.

4. The method according to claim 1, further comprising performing control so that a communication channel used in the first connection and a communication channel used in the second connection are identical.

5. The method according to claim 1, further comprising transmitting a response request to the communication apparatus via the external apparatus in the state in which the communication apparatus and the terminal apparatus are connected to the same apparatus that is the external apparatus as a result of establishing the first connection,
    wherein determining whether communication between the communication apparatus and the terminal apparatus via the external apparatus is executable is executed by the terminal apparatus, wherein, in a case where the terminal apparatus receives a response based on the response request from the communication apparatus via the external apparatus, a determination is made that communication between the communication apparatus and the terminal apparatus via the external apparatus is executable, and wherein in a case where the terminal apparatus does not receive a response based on the response request from the communication apparatus via the external apparatus, a determination is made that communication between the communication apparatus and the terminal apparatus via the external apparatus is not executable.

6. The method according to claim 1, further comprising:

establishing a third connection between the terminal apparatus and the communication apparatus before the first connection is established;

transmitting first connection information for establishing the first connection to the communication apparatus via the third connection; and receiving second connection information for establishing the second connection from the communication apparatus via the third connection, wherein the first connection is established based on the first connection information received by the communication apparatus, and wherein the second connection is established based on the second connection information received by the terminal apparatus.

7. The method according to claim 6, wherein a communication method used in the third connection is different from a communication method used in the first connection and a communication method used in the second connection.

8. The method according to claim 7, further comprising receiving information about whether the first connection is successfully established, from the communication apparatus via the third connection.

9. The method according to claim 7, wherein the communication method used in the third connection is Classic Bluetooth®, Bluetooth® Low Energy, Wi-Fi Aware™, or Near Field Communication.

10. The method according to claim 6, wherein a communication method used in the third connection is the same as a communication method used in the first connection and a communication method used in the second connection.

11. The method according to claim 6, further comprising receiving an instruction to establish the first connection from a user via the terminal apparatus, wherein the first connection information is transmitted to the communication apparatus based on receipt of the instruction, and wherein the first connection information is information for establishing the first connection between the communication apparatus and the external apparatus to which the terminal apparatus is connected when the instruction is received.

12. The method according to claim 11, wherein, in a case where the terminal apparatus is connected to the external apparatus when the instruction is received, information for establishing the first connection between the communication apparatus and the external apparatus to which the terminal apparatus is connected when the instruction is received is transmitted as the first connection information to the communication apparatus, and wherein, in a case where the terminal apparatus is not connected to the external apparatus when the instruction is received, information for establishing the first connection between the communication apparatus and the external apparatus to which the terminal apparatus is not connected when the instruction is received is transmitted as the first connection information to the communication apparatus.

13. The method according to claim 11, wherein, in a case where the terminal apparatus is connected to the external apparatus when the instruction is received, the first connection information is transmitted to the communication apparatus, wherein, in a case where the terminal apparatus is not connected to the external apparatus when the instruction is received, the first connection information is not transmitted to the communication apparatus and a command for establishing the second connection is transmitted to the communication apparatus, and wherein, in the case where the command is transmitted to the communication apparatus, the first connection is not established and the second connection is established.

14. The method according to claim 1, wherein an apparatus other than the terminal apparatus that communicates with the communication apparatus via the first connection is a server configured to provide a social networking service to the communication apparatus via the Internet.

15. The method according to claim 1, wherein, in a case where a determination is made that communication between the communication apparatus and the terminal apparatus via the external apparatus is executable, specific information is received from the communication apparatus via the first connection, and wherein, in a case where a determination is made that communication between the communication apparatus and the terminal apparatus via the external apparatus is not executable, the specific information is received from the communication apparatus via the second connection.

16. The method according to claim 15, wherein the specific information is a print job for causing the communication apparatus to execute printing or a scan job for causing the communication apparatus to execute scanning.

17. The method according to claim 1, wherein a communication method used in the first connection and a communication method used in the second connection are a communication method based on the Institute of Electrical and Electronics Engineers (IEEE) 802.11 standards.

18. A method for controlling a communication system including a terminal apparatus and a communication apparatus, the method comprising:

establishing a first connection between the communication apparatus and an external apparatus located external to the terminal apparatus and external to the communication apparatus;

determining, in a state where the communication apparatus and the terminal apparatus are connected to a same apparatus that is the external apparatus as a result of the establishing the first connection, whether communication between the communication apparatus and the terminal apparatus via the external apparatus is executable;

enabling an internal access point in the communication apparatus;

establishing, in a state in which the established first connection is maintained, a second connection between the terminal apparatus and the communication apparatus without intervention of the external apparatus based on a determination that communication between the communication apparatus and the terminal apparatus via the external apparatus is not executable; and disabling the internal access point in a case where the second connection is not established as a result of the determination that communication between the communication apparatus and the terminal apparatus via the external apparatus is not executable;

wherein the second connection is a connection between the terminal apparatus and the communication apparatus via the enabled internal access point.

19. A method for controlling a communication system including a terminal apparatus and a communication apparatus, the method comprising:

establishing a first connection between the communication apparatus and an external apparatus located external to the terminal apparatus and external to the communication apparatus;

determining, in a state where the communication apparatus and the terminal apparatus are connected to a same apparatus that is the external apparatus as a result of the establishing the first connection, whether communication between the communication apparatus and the terminal apparatus via the external apparatus is executable;

establishing, in a state in which the established first connection is maintained, a second connection between the terminal apparatus and the communication apparatus without intervention of the external apparatus based on a determination that communication between the communication apparatus and the terminal apparatus via the external apparatus is not executable; and establishing a third connection between the terminal apparatus and the communication apparatus before the first connection is established;

transmitting first connection information for establishing the first connection to the communication apparatus via the third connection; and receiving second connection information for establishing the second connection from the communication apparatus via the third connection, wherein the first connection is established based on the first connection information received by the communication apparatus, and wherein the second connection is established based on the second connection information received by the terminal apparatus.

* * * * *